United States Patent

Kashima

[11] Patent Number: 5,631,779
[45] Date of Patent: May 20, 1997

[54] OBJECTIVE LENS SYSTEM

[75] Inventor: Shingo Kashima, Sagamihara, Japan

[73] Assignee: Olympus Optical Co., Ltd., Tokyo, Japan

[21] Appl. No.: 704,237

[22] Filed: Aug. 28, 1996

Related U.S. Application Data

[63] Continuation of Ser. No. 247,582, May 23, 1994, abandoned.

[30] Foreign Application Priority Data

May 24, 1993 [JP] Japan .................................. 5-142513
Jun. 7, 1993 [JP] Japan .................................. 5-160028

[51] Int. Cl.[6] .................................................. G02B 3/08
[52] U.S. Cl. ............................................ 359/742; 359/570
[58] Field of Search ................................. 359/742, 754, 359/755, 570, 558, 566, 569

[56] References Cited

U.S. PATENT DOCUMENTS 4,936,665  6/1990  Whitney .
5,268,790  12/1993  Chen ......................................... 359/558

FOREIGN PATENT DOCUMENTS

| 59-33636 | 2/1984 | Japan . |
| 60-247611 | 12/1985 | Japan . |
| 63-77003 | 4/1988 | Japan . |
| 63-155432 | 6/1988 | Japan . |
| 2-1109 | 1/1990 | Japan . |
| 4214516 | 8/1992 | Japan . |
| 4361201 | 12/1992 | Japan . |

*Primary Examiner*—Georgia Y. Epps
*Assistant Examiner*—Dawn-Marie Bey
*Attorney, Agent, or Firm*—Cushman, Darby & Cushman IP Group of Pillsbury Madison & Sutro LLP

[57] ABSTRACT

An objective lens system comprising at least one diffractive optical element, having a high magnification and a large numerical aperture, and capable of favorably correcting aberrations, in particular, longitudinal chromatic aberration and lateral chromatic aberration.

12 Claims, 21 Drawing Sheets

FIG. 1
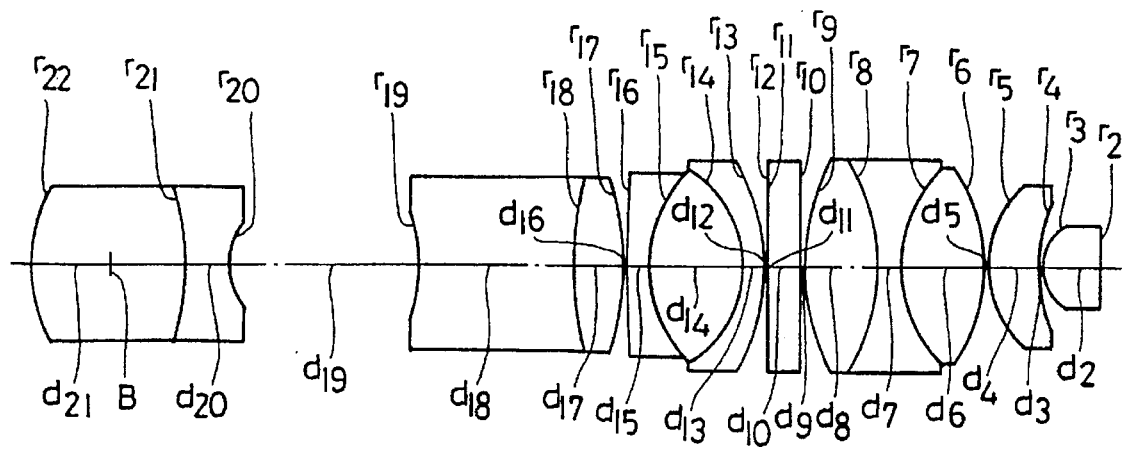
FIG. 2A
SPHERICAL ABERRATION
FIG. 2B
ASTIGMATISM
FIG. 2C
DISTORTION
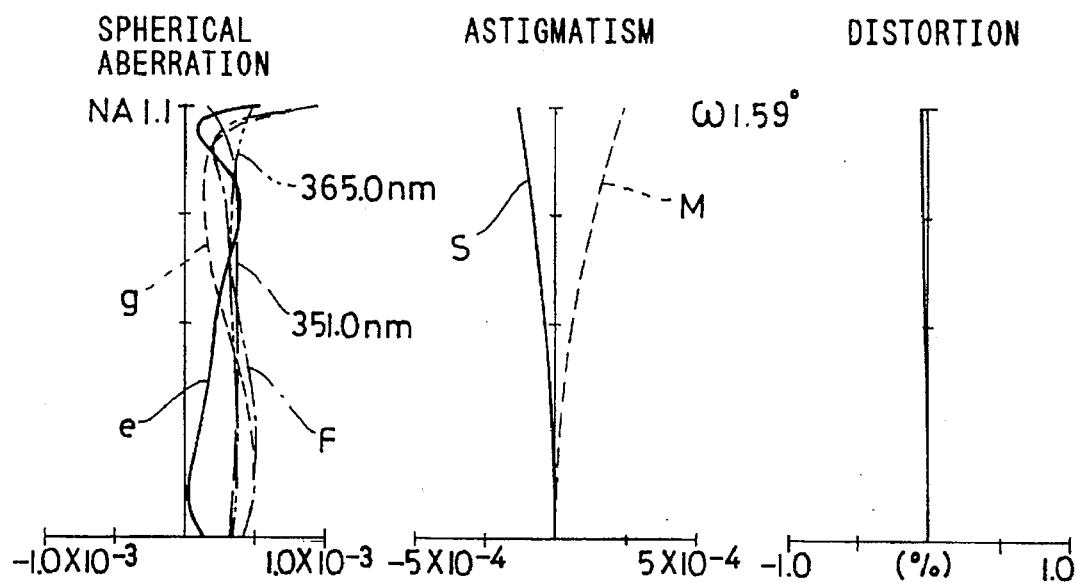

SPHERICAL
ABERRATION

ASTIGMATISM

DISTORTION

FIG. 7
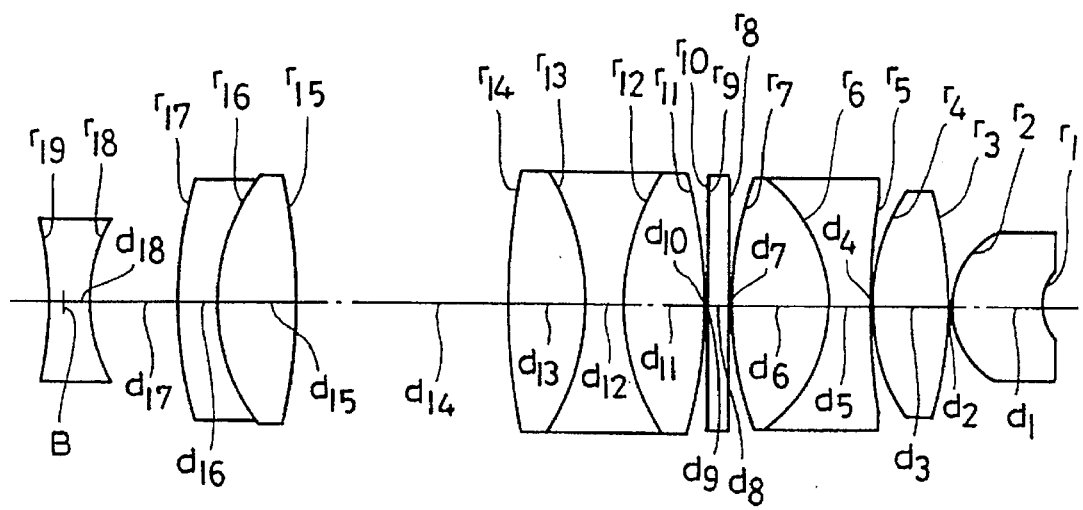
FIG. 8A
SPHERICAL
ABERRATION
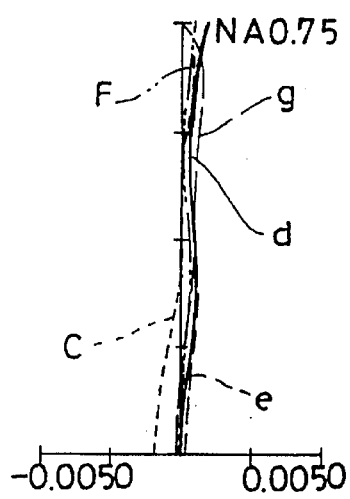
FIG. 8B
ASTIGMATISM
FIG. 8C
DISTORTION
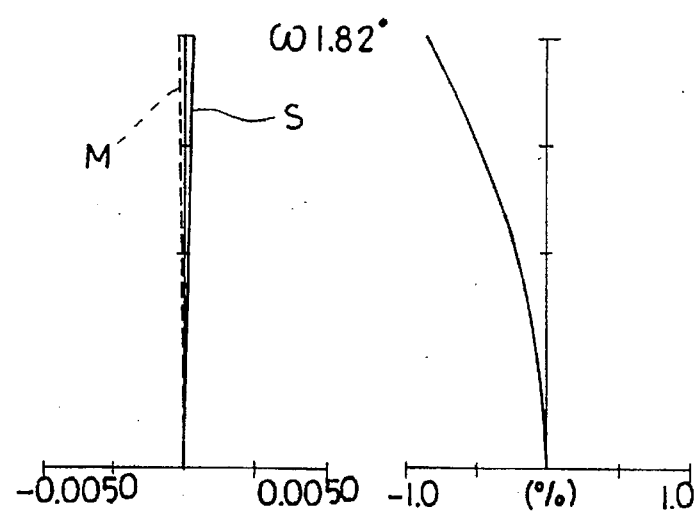

FIG. 10
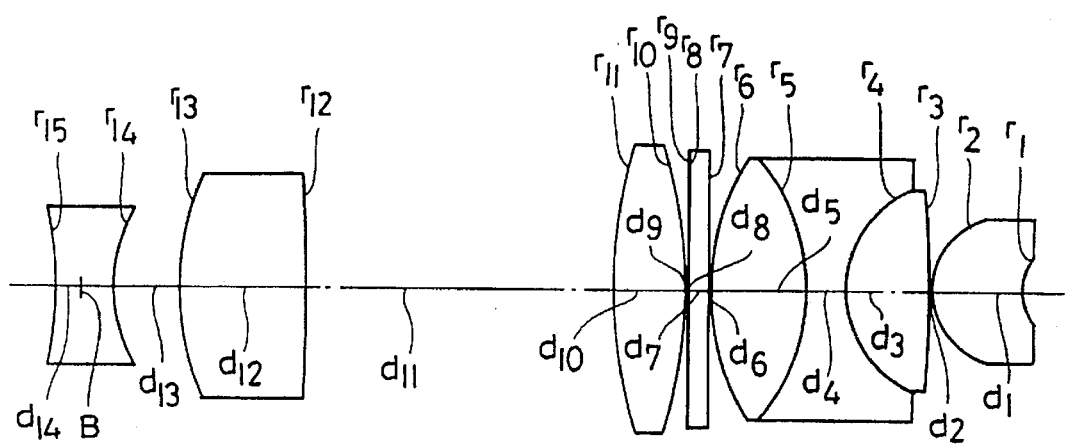
FIG. 11A
SPHERICAL
ABERRATION
FIG. 11B
ASTIGMATISM
FIG. 11C
DISTORTION
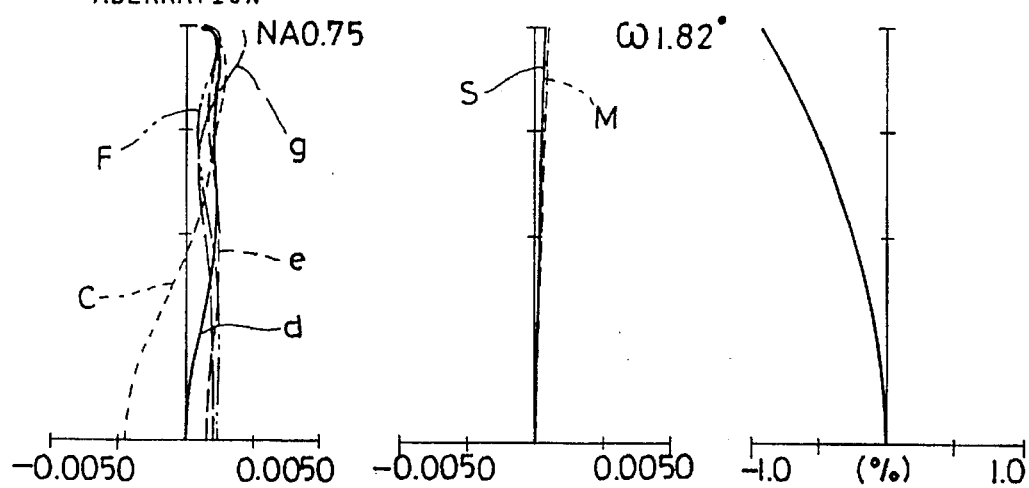

2nd LENS UNIT | 1st LENS UNIT

SPHERICAL ABERRATION

ASTIGMATISM

DISTORTION

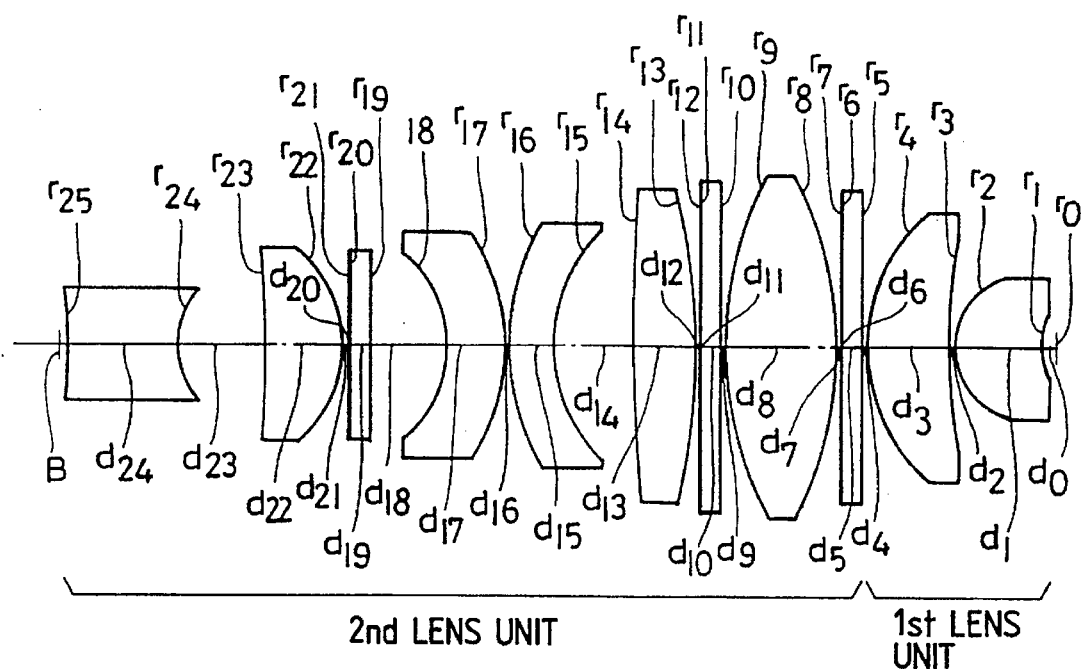
FIG. 19
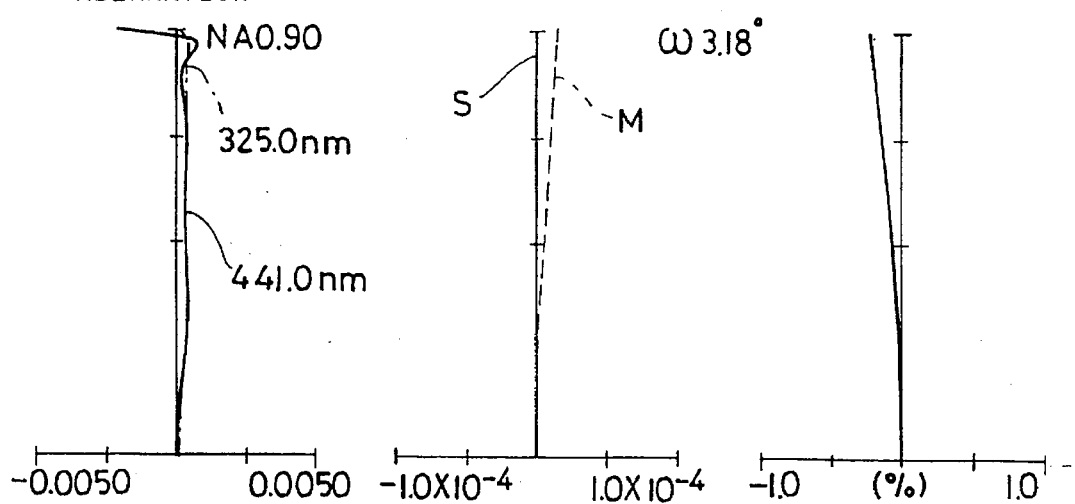
FIG. 20A
SPHERICAL ABERRATION
FIG. 20B
ASTIGMATISM
FIG. 20C
DISTORTION 2nd LENS UNIT | 1st LENS UNIT

SPHERICAL ABERRATION

ASTIGMATISM

DISTORTION

FIG. 25
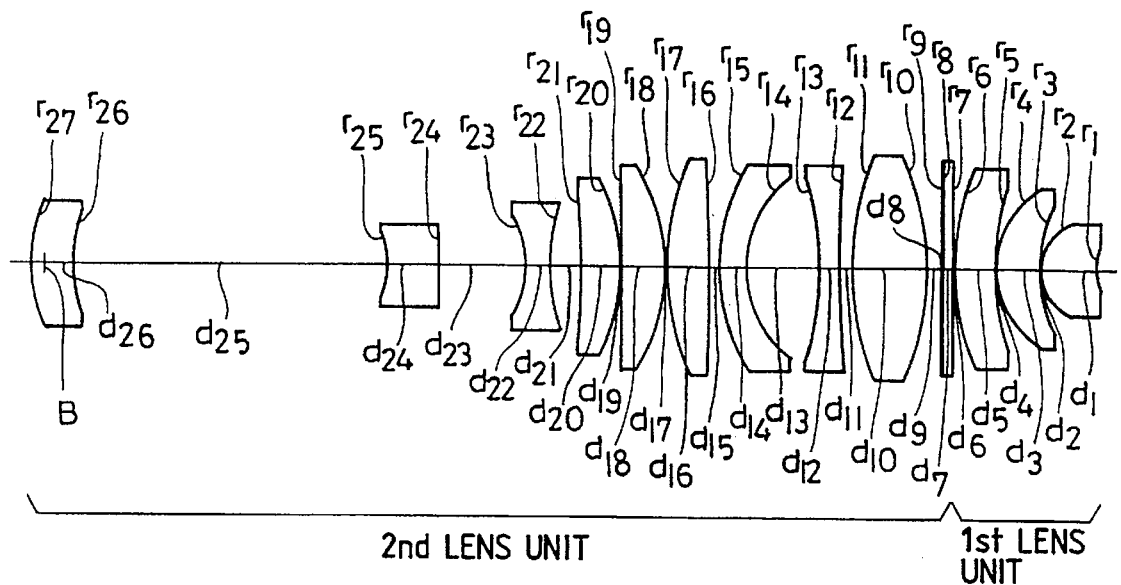
2nd LENS UNIT | 1st LENS UNIT
FIG. 26A
SPHERICAL ABERRATION
FIG. 26B
ASTIGMATISM
FIG. 26C
DISTORTION
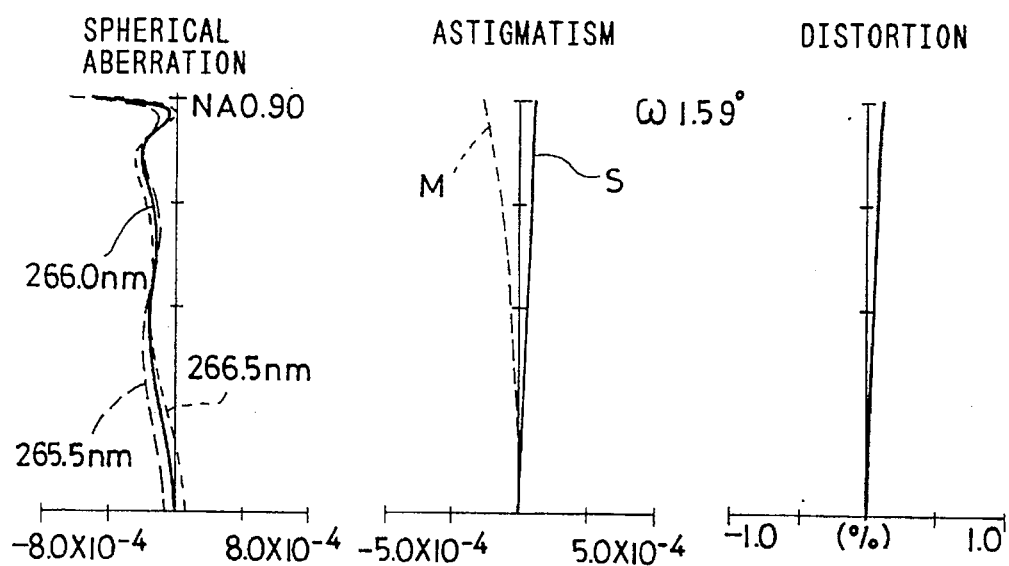

OBJECTIVE LENS SYSTEM

This is a continuation of application Ser. No. 08/247,582, filed on May 23, 1994, which was abandoned upon the filing hereof.

BACKGROUND OF THE INVENTION

1. Field of the Invention

The present invention relates to an objective lens system which is to be used in combination with optical systems for microscopes and so on.

2. Description of the Prior Art

The conventional objective lens systems, in particular, those which have high magnifications and large numerical apertures needed to comprise large numbers of cemented lens components and use anomalous dispersion glass materials for favorably correcting aberrations, in particular, chromatic aberration. Accordingly, the objective lens systems were inevitably expensive, and it was impossible to design objective lens systems for the ultraviolet region and the infrared region which require lens elements made of glass materials selectable within a restricted range.

In recent days, attention is paid to optical systems which use diffractive optical elements as lens elements for composing the lens systems. As conventional examples of objective lens systems which use diffractive optical elements and are of a type which is similar to that of the objective lens system according to the present invention, there are known those disclosed by Japanese Patents Kokai Publication No. Sho 63-77,003, Kokai Publication No. Sho 63-155,432, Kokai Publication No. Sho 59-33,636, Kokai Publication No. Sho 60-247,611, Kokai Publication No. Hei 2-1,109 and Kokai Publication No. Hei 4-361,201.

Diffractive optical elements which utilize the diffraction phenomenon of light are described in "NEW METHODS OF DESIGNING HOLOGRAPHIC OPTICAL ELEMENTS" by William C. Sweatt (SPIE. VOL. 126, P46–53, 1977), etc. The operating principle of the diffractive optical elements can be summarized as follows:

An ordinary glass material refracts a ray as illustrated in FIG. 28 or according to Snell's law which is expressed by the following formula (1):

$$n \sin \theta = n' \sin \theta' \qquad (1)$$

wherein the reference symbol n represents a refractive index of a medium located on the side of incidence of the glass material, the reference symbol n' designates a refractive index of a medium located on the side of emergence of the glass material, the reference symbol $\theta$ denotes an angle of incidence of a ray and the reference symbol $\theta'$ represents an angle of emergence of the ray.

Speaking of the diffraction phenomenon, on the other hand, a ray is diffracted as illustrated in FIG. 29 or according to the law of diffraction which is expressed by the following formula (2):

$$n \sin \theta - n' \sin \theta' = m\lambda/d \qquad (2)$$

wherein the reference symbol m represents an order of a diffracted ray, the reference symbol $\lambda$ designates a wavelength and the reference symbol d denotes a spacing between two adjacent grooves formed on a diffractive optical element of interest.

Means by "diffractive optical element" is an optical element which is configured so as to deflect rays according to the law expressed by the above-mentioned formula (2). Though shielding sections and transmitting sections are disposed regularly at the spacing d in FIG. 29, it is possible to obtain a high diffraction efficiency by forming a diffractive surface having a saw-tooth-like sectional shape on a transparent material or approximating the sectional shape by the binary technique.

Now, description will be made below of advantages obtainable by using such a diffractive optical element:

The following formula (3) applies to a thin refractive lens element:

$$1/f = (n-1)(1/r_1 - 1/r_2) \qquad (3)$$

wherein the reference symbol f represents a focal length of the refractive lens element, the reference symbols $r_1$ and $r_2$ designate radii of curvature on a surface of incidence and a surface of emergence respectively of the refractive lens element, and the reference symbol n denotes a refractive index of the refractive lens element.

Differentiation of both the sides of the above-mentioned formula (3) by wavelength $\lambda$ gives the following formula (4):

$$df/d\lambda = -f(dn/d\lambda)/(n-1) \qquad (4)$$

$$\therefore \Delta f = -f\{\Delta n/(n-1)\}$$

Since $\Delta n/(n-1)$ which is obtained by removing the effect produced by the multiplication of the coefficient represents a dispersion characteristic of the lens element, a dispersion value $\nu$ of the lens element can be defined as follows:

$$\nu \equiv (n-1)/\Delta n \qquad (5)$$

Hence, the lens element has a dispersion value (Abbe's number) in the visible region which is expressed as follows:

$$\nu_d = (n_d - 1)/(n_F - n_C) \qquad (6)$$

On the other hand, the diffractive optical element has a focal length expressed by the following formula (7):

$$f = h/(n' \sin \theta') = (d_h h)/(m\lambda) \qquad (7)$$

wherein the reference symbol f represents a focal length of the diffractive optical element and the reference symbol $d_h$ designates a groove spacing at a height h of incident parallel rays.

Since $d_h$ h is constant for an aplanatic diffractive optical element when it is considered according to the paraxial theory, f can be expressed as f=con./$\lambda$ ("con" is an abbreviation of a constant). Differentiation of both the sides of f=con./$\lambda$ by $\lambda$ gives the following formula (8):

$$df/d\lambda = -con./\lambda^2 = -f/\lambda \qquad (8)$$

$$\Delta f = -f(\Delta \lambda/\lambda)$$

Since $\Delta n/(n-1)$ is equal to $\nu$, we obtain $\nu = \lambda/\Delta\lambda$ from the formulae (4) and (8). Therefore, the diffractive optical element has an Abbe's number expressed by the following formula (9) in the visible region:

$$\lambda_d = \lambda_d/(\lambda_F - \lambda_C) = -3.453 \qquad (9)$$

Hence, the diffractive optical element has a negative dispersion value which is very large in absolute. Since the ordinary glass materials have dispersion values of approximately 20 to 95, it will be understood that the diffractive optical element has a remarkably inverse dispersion characteristic. Similar calculations lead to an understanding that the diffractive optical element has anomalous dispersion characteristic.

Out of the objective lens systems mentioned as the conventional examples, the objective lens systems disclosed by Japanese Patents Kokai Publication No. Sho 63-77,093, Kokai Publication No. Sho 63-155,432, Kokai Publication No. Sho 59-33,636 and Kokai Publication No. Sho 60-247,611 are pickup lens systems for optical discs. Each of these objective lens system comprises one or two diffractive optical elements or a single refractive optical element (lens element) and a single diffractive optical element, fundamentally uses a monochromatic light source and does not utilize the function of the diffractive optical element for correcting chromatic aberration.

Further, the objective lens systems disclosed by Japanese Patents Kokai Publication No. Hei 2-1,109 and Kokai Publication No. Hei 4-361,201 are steppers to be used with photographic lens systems and composed of lens elements made only of fused silica without using cemented lens components. The former objective lens system disclosed by Japanese Patent Kokai Publication No. Hei 2-1,109, in particular, is characterized in that it comprises a diffractive optical element disposed at a location of a pupil of the objective lens system, whereas the latter objective lens system disclosed by Japanese Patent Kokai Publication No. Hei 4-361,201 is characterized in that it utilizes rays diffracted by a marginal portion of the diffractive optical element rather than those diffracted by a central portion thereof.

However, the conventional pickup lens systems are not usable as objective lens systems for microscopes which must have more complicated compositions. The conventional stepper type lens systems may be usable as objective lens systems for microscopes having low magnifications, but are unusable as objective lens systems for microscopes which have high magnifications and large numerical apertures, since it is necessary for correcting chromatic aberration in an objective lens systems only with the diffractive optical elements that they have strong refractive powers and groove pitches which are too narrow for practical manufacturing.

SUMMARY OF THE INVENTION

A primary object of the present invention is to provide an objective lens system which has a high magnification and a large numerical aperture, and is capable of correcting aberrations, in particular chromatic aberration without using a large number of cemented lens component or an anomalous dispersion glass material.

The objective lens system according to the present invention is characterized in that it comprises at least one diffractive optical element and at least one cemented lens component, and is capable of correcting aberrations, in particular chromatic aberration, by using a small number of optical elements and no special glass material.

The ordinary objective lens systems use, for correcting chromatic aberration, cemented lens components composed of lens elements which are made of glass materials having different Abbe's numbers. The ordinary glass materials have Abbe's numbers of positive values within a range of 20 to 95. The diffractive optical elements have, in contrast, negative Abbe's numbers which are small in absolute as described above. It is therefore possible to obtain strong functions for correcting chromatic aberration by combining the diffractive optical elements with lens elements which are made of the ordinary glass materials.

Further, high-grade objective lens systems are to be apochromatic for correcting chromatic aberration and must use lens elements which are made of anomalous dispersion glass materials. However, the anomalous dispersion glass materials are expensive and can hardly be polished so as to have forms precisely as desired. Accordingly, the high-grade objective optical systems are expensive. This problem can also be solved by utilizing anomalous dispersion characteristics of the diffractive optical elements.

For correcting chromatic aberration by using a single diffractive optical element in an objective lens system which has a large numerical aperture and a high magnification, the diffractive optical element must have a strong refractive power and too narrow a groove pitch. However, the groove pitch may not be so narrow when the diffractive optical element is used in combination with a cemented lens component so that the function for correcting chromatic aberration is shared between the cemented lens component and the diffractive optical element.

It is desirable for correcting chromatic aberration more favorably that at least one of the diffractive optical elements in an objective lens system satisfies at least either of the following conditions (1) and (2):

(1) $D_1/D > 0.8$ (2) $(h \times f)/(L \times I) > 0.07$ wherein the reference symbol $D_1$ represents a diameter of a marginal light bundle as measured at a location of the diffractive optical element, the reference symbol D designates a maximum diameter of the marginal light bundle in the objective lens system, the reference symbol h denotes a height of a principal ray on the surface of the diffractive optical element, the reference symbol f represents a focal length of the objective lens system, the reference symbol I designates a maximum image height on a specimen surface and the reference symbol L denotes a parfocality length.

Chromatic aberration can be classified into two types: longitudinal chromatic aberration which means deviations of a focusing point dependent on wavelengths and lateral chromatic aberration which means deviations of a focal length (magnification) dependent on wavelengths.

For correcting the longitudinal chromatic aberration, out of the two types mentioned above, it is most effective to dispose the diffractive optical element at a location of a pupil of the objective lens system. However, the diffractive optical element need not be disposed precisely at the location of the pupil and the longitudinal chromatic aberration can be corrected effectively by disposing the diffractive optical element at a location which is in the vicinity of the pupil and at which the light bundle (axial marginal light bundle) has a large diameter. The condition (1) defines a location at which the diffractive optical element is to be disposed. If $D_1/D$ is smaller than the lower limit of 0.8 of the condition (1), the diffractive optical element cannot correct the longitudinal chromatic aberration produced by other refractive optical elements (lens elements), thereby making it necessary to use a large number of cemented lens components or anomalously dispersive glass materials while cancelling the effect obtained by using the diffractive optical element.

For correcting the lateral chromatic aberration, on the other hand, it is effective to dispose the diffractive optical element not at the location of the pupil of the objective lens system, but at a location which is a little apart from the pupil and at which the principal ray has a height of a certain degree. The condition (2) defines a location of the diffractive optical element which is to be selected for effective correction of the lateral chromatic aberration. If the lower limit of 0.07 of the condition (2) is exceeded, it will be impossible to correct the lateral chromatic aberration sufficiently with the diffractive optical element, thereby making it necessary to use a large number of cemented lens components comprising refractive optical elements or anomalously dispersive glass materials while cancelling the effect obtained by the diffractive optical element. In the condition (2) mentioned above, f, L and I are used for normalizing this condition: f/I being a parameter of an angle of the principal ray and L being a parameter for scaling the objective lens system as a whole.

For correcting chromatic aberration more favorably in the objective lens system according to the present invention, it is desirable to dispose the diffractive optical element at a location which is matched with a purpose of application of thereof and satisfies at least either of the above-mentioned conditions (1) and (2).

When at least one cemented lens component and at least one diffractive optical element are to be used in an objective lens system for sharing the function to correct chromatic aberration, it is desirable that a difference $\Delta v$ between Abbe's numbers of two lens elements disposed in the cemented lens component satisfies the following condition (3):

(3) $\Delta v > 20$

If $\Delta v$ is smaller than the lower limit of 20 of the condition (3), the cemented lens component will have an insufficient function for correcting chromatic aberration, thereby making it impossible to select, for the diffractive optical element, a minimum groove pitch is so wide.

Further, diffractive optical elements feature a merit that they permit optionally selecting pitches of grooves to be formed thereon. Accordingly, the diffractive optical elements can have functions equivalent to those of optional aspherical lens elements, provide freedom for lens design which is higher than that of the ordinary aspherical lens elements, for example, to obtain surfaces having a large number of deflection points and can be manufactured with high precision. Though graded refractive index lens elements are capable of correcting chromatic aberration, these lens elements can be manufactured only within a limited ranges in practice and do not permit utilizing the ultraviolet rays or the infrared rays. The diffractive optical elements are more excellent in the viewpoint of the function to correct aberrations and more advantageous from a viewpoint of manufacturing than the aspherical lens elements and the graded refractive index lens elements. It is therefore possible to enhance optical performance of objective lens systems and reducing manufacturing cost thereof by using the diffractive optical elements as in the case of the objective lens system according to the present invention. Furthermore, use of the diffractive optical elements makes it possible to design objective lens systems which are conventionally unavailable.

For obtaining an objective lens system which can accomplish the object of the present invention, it is conceivable to select a composition described below. In a composition selected for such an objective lens system, a first lens unit comprises a plano-convex lens component having a planar surface on the object side or a meniscus lens component having a concave surface on the image side and has a positive refractive power as a whole and a second lens unit comprises at least one diffractive optical element, and the objective lens system is characterized in that it satisfies the following conditions (4), (1) and (2):

(4) $0.5 < |R/t| < 5$ (1) $D_1/D > 0.8$ (2) $(h \times f)/(L \times I) > 0.07$ wherein the reference symbol R represents a radius of curvature on an image side surface of the meniscus lens component, the reference symbol t designates thickness of the meniscus lens component, the reference symbol $D_1$ denotes a diameter of a marginal light bundle as measured on the surface of the diffractive optical element, the reference symbol D represents a maximum diameter of the marginal light bundle in the objective lens system, the reference symbol h designates a height of the principal ray on the diffractive optical element, the reference symbol f denotes a focal length of the objective lens system as a whole, the reference symbol L represents a parfocality length and the reference symbol I designates a maximum image height on a specimen surface.

An objective lens system which has a large numerical aperture and a high magnification must use a front lens component which has a surface having a strong refractive power for converging rays emitted from an object with a large numerical aperture. When a surface having such a strong refractive power is used as an object side surface of the front lens component, this surface will produce remarkable aberration. Therefore, a front lens component is inevitably configured as a meniscus lens component which has a planar surface or a concave surface on the object side. Since the meniscus lens component must have an image side surface which has a strong refractive power and a very small radius of curvature, the front lens component becomes nearly semispherical for reserving required marginal thickness. The condition (4) defines a shape of a front lens component to be used in the objective lens system according to the present invention. If the lower limit of 0.5 of the condition (4) is exceeded, it will be impossible to reserve the required marginal thickness for the front meniscus lens component. If the upper limit of 5 of the condition (4) is exceeded, the image side surface of the front lens component will have too weak a refractive power, whereby the front lens component will be incapable of effectively converging the rays coming from the object.

In the objective lens system according to the present invention, rays which are slightly converged by the front meniscus lens component are further converged by several positive lens components disposed in the first lens unit and then led to the second lens unit comprising the diffractive optical element which functions to correct chromatic aberration.

Chromatic aberration can be classified into two types: longitudinal chromatic aberration which means deviations of a focusing point dependent on wavelengths and lateral chromatic aberration which means deviations of a focal length (magnification) dependent on wavelengths.

For correcting the longitudinal chromatic aberration, out of the two types mentioned above, it is most effective to dispose the diffractive optical element at a location of a pupil of the objective lens system. However, the diffractive optical element need not be disposed precisely at the location of the pupil and the longitudinal chromatic aberration can be corrected effectively by disposing the diffractive optical element at a location which is in the vicinity of the pupil and at which the light bundle (axial marginal light bundle) has a large diameter.

The condition (1) defines a location at which the diffractive optical element is to be disposed for effectively correcting the longitudinal chromatic aberration. If the lower limit of 0.8 of the condition (1) is exceeded, the diffractive optical element cannot sufficiently correct the longitudinal chromatic aberration produced by other refractive optical elements (lens elements), thereby making it necessary to use a large number of cemented lens components or anomalously dispersive glass materials while cancelling the effect obtained with the diffractive optical element.

For correcting the lateral chromatic aberration, on the other hand, it is effective to dispose the diffractive optical element not at the location of the pupil of the objective lens system, but at a location which is a little apart from the pupil and at which the principal ray has a height of a certain degree. The condition (2) defines a location of the diffractive optical element which is to be selected for effective correction of the lateral chromatic aberration. If the lower limit of 0.07 of the condition (2) is exceeded, it will be impossible to correct the lateral chromatic aberration sufficiently with the diffractive optical element, thereby making it necessary to use a large number of cemented lens components comprising refractive optical elements or anomalously dispersive glass materials while cancelling the effect obtained by the diffractive optical element.

As is understood from the foregoing description, it is necessary for effective correction of chromatic aberration that at least one diffractive optical element satisfies the condition (1).

BRIEF DESCRIPTION OF THE DRAWINGS

FIG. 1 shows a sectional view illustrating a composition of a first embodiment of the objective lens system according to the present invention;

FIG. 2A, FIG. 2B and FIG. 2C show graphs illustrating spherical aberration, astigmatism and distortion in the first embodiment of the present invention;

FIG. 7 shows a sectional view illustrating a composition of a third embodiment of the objective lens system according to the present invention;

FIG. 8A, FIG. 8B and FIG. 8C show curves visualizing spherical aberration, astigmatism and distortion in the third embodiment of the present invention;

FIG. 10 shows a sectional view illustrating a composition of a fourth embodiment of the objective lens system according to the present invention;

FIG. 11A, FIG. 11B and FIG. 11C show curves visualizing spherical aberration, astigmatism and distortion in the fourth embodiment of the present invention;

FIG. 19 shows a sectional view illustrating a composition of a seventh embodiment of the objective lens system according to the present invention;

FIG. 20A, FIG. 20B and FIG. 20C show graphs visualizing spherical aberration, astigmatism and distortion in the seventh embodiment of the present invention;

FIG. 25 shows a sectional view illustrating a composition of a ninth embodiment of the objective lens system according to the present invention;

FIG. 26A, FIG. 26B and FIG. 26C show graphs illustrating spherical aberration, astigmatism and distortion in the ninth embodiment of the present invention;

DETAILED DESCRIPTION OF THE PREFERRED EMBODIMENTS

Figure 32:
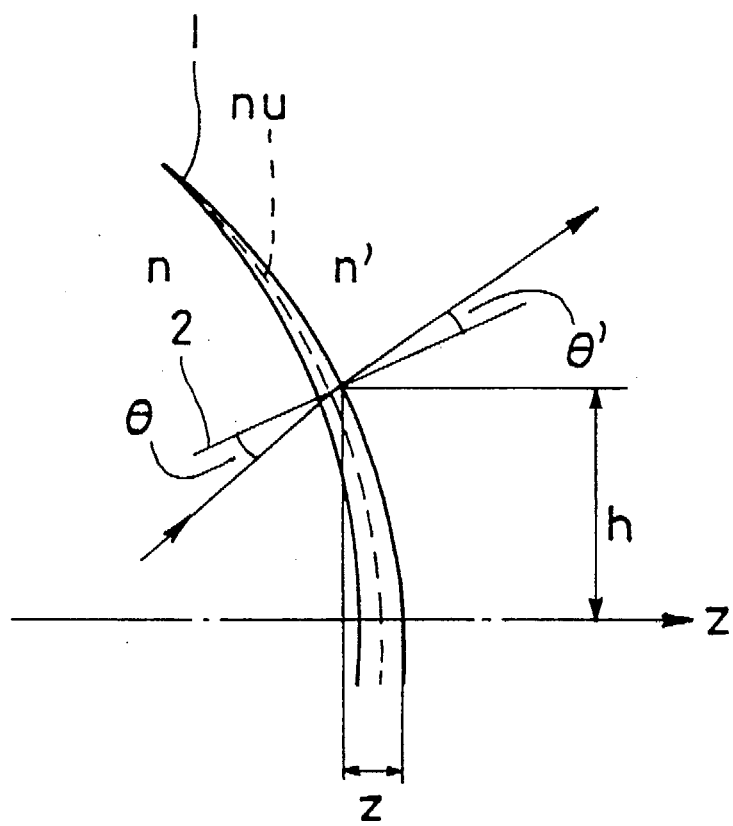
FIG. 32 shows a diagram illustrating refraction of light by an ultra-high index lens element.

Now, the objective lens system according to the present invention will be described more detailedly below with reference to the preferred embodiments illustrated in the accompanying drawings. First, the diffractive optical element to be used in the objective lens system according to the present invention will be described more detailedly. Diffractive optical elements of the type which has already been described above are used in the embodiments of the present invention to be explained later. As methods for designing lens systems using such diffractive optical elements, there are known those which are referred to as ultra-high index methods which regard, for designing lens systems, the diffractive optical elements as imaginary lens elements having very high refractive indices (ultra-high index lens elements). These methods will be described briefly below by using FIG. 20 shown on pages 46 to 53, SPIE VOL. 46 (1977). In FIG. 32, the reference numeral 1 represents an ultra-high index lens element and the reference numeral 2 designates a normal to the ultra-high index lens element. This ultra-high index lens element deflects a ray in relationship expressed by the following formula (11):

$$(n_U-1)dz/dh=n \sin \theta - n' \sin \theta' \quad (11)$$

wherein the reference symbol $n_U$ represents a refractive index of the ultra-high index lens element, the reference symbol z designates a distance as measured from an origin to the ultra-high index lens element in a direction along an optical axis (abscissa value), the reference symbol h denotes a distance as measured from the optical axis to an incident point, the reference symbols n and n' denote refractive indices of media located on the side of incidence and the side of emergence respectively of the ultra-high index lens element, and the reference symbols $\theta$ and $\theta'$ represent an angle of incidence and an angle of emergence respectively of a ray of interest. In addition, $n_U=1001$ or $10001$ is adopted for the numerical data of the embodiments of the present invention which are to be described later.

The formulae (2) and (11) give the following formula (12):

$$(n_U-1)\, dz/dh=m\lambda/d \quad (12)$$

That is to say, an equivalent relationship expressed by the formula (12) establishes between a shape of surface of an ultra-high index lens element (a refractive lens element having a very high refractive index) and a groove pitch on a diffractive optical element, and a groove pitch for a diffractive optical element can be determined on the basis of numerical data obtained by the ultra-high index methods.

A general axially asymmetrical aspherical surface has a shape which is expressed as follows:

$$z=ch^2/[1+\{1-c^2(k+1)h^2\}^{1/2}]+Ah^4+Bh^6+Ch^8+Dh^{10}+ \quad (13)$$

wherein the reference symbol z represents an optical axis (a direction toward an image is taken as positive), the reference symbol h designates a value on a meridional axis among axes perpendicular to the z axis on a coordinates system on which an intersection between the aspherical surface and the z axis is taken as an origin, the reference symbol c denotes curvature on a reference sphere of the aspherical surface, the reference symbol k represents a conical constant, and the reference symbols A, B, C, D, . . . designate aspherical surface coefficients of the fourth, sixth, eighth, tenth, . . . orders respectively.

From the formulae (12) and (13), we obtain the following formula (14) for expressing a groove pitch d of the diffractive optical element which is equivalent to the aspherical surface at a given height of ray:

$$d=m\lambda/[(n-1)\{ch/\{1+(1-c^2(1+k)h^2)^{1/2}\}* 4Ah^3+6Bh^5+8Ch^7+10Dh^9+\ldots\}] \quad (14)$$

Though the terms of the aspherical coefficients up to the tenth order are used in the embodiments of the present invention which are to be described later, it is possible to adopt terms of aspherical coefficients of twelfth, fourteenth, . . . orders.

Numerical data of the embodiments of the present invention will be listed below:

Embodiment 1 focal length=3.6 mm, NA=1.1 (submerged),
magnification=100, Parfocality length=45 mm,
maximum image height on speciman surface=0.05 mm

| | | | |
|---|---|---|---|
| $r_0 =$ | ∞ (object surface) | | |
| | $d_0 = 0.17$ | $n_0 = 1.521$ | $v_0 = 56.02$ |
| $r_1 =$ | ∞ | | |
| | $d_1 = 0.12$ | $n_1, v_1$ | (water) |
| $r_2 =$ | ∞ | | |
| | $d_2 = 2.5814$ | $n_2 = 1.596$ | $v_2 = 39.3$ |
| $r_3 =$ | −2.0016 | | |
| | $d_3 = 0.15$ | | |
| $r_4 =$ | −6.6313 | | |
| | $d_4 = 2.2727$ | $n_3 = 1.678$ | $v_3 = 55.34$ |
| $r_5 =$ | −4.4815 | | |
| | $d_5 = 0.15$ | | |
| $r_6 =$ | 7.2872 | | |
| | $d_6 = 3.7582$ | $n_4 = 1.488$ | $v_4 = 70.21$ |
| $r_7 =$ | −5.6995 | | |
| | $d_7 = 1.0$ | $n_5 = 1.678$ | $v_5 = 55.34$ |
| $r_8 =$ | 8.2626 | | |
| | $d_8 = 3.3432$ | $n_6 = 1.497$ | $v_6 = 81.14$ |
| $r_9 =$ | −9.3735 | | |
| | $d_9 = 0.15$ | | |
| $r_{10} =$ | ∞ | | |
| | $d_{10} = 1.5$ | $n_7 = 1.516$ | $v_7 = 64.14$ |
| $r_{11} =$ | ∞ | | |
| | $d_{11} = 0$ | | |
| $r_{12} =$ | −5.5443 × 10⁶ (DOE) ($n_U = 10001$) | | |
| | $d_{12} = 0.15$ | | |
| $r_{13} =$ | 8.6431 | | |
| | $d_{13} = 1.0$ | $n_8 = 1.678$ | $v_8 = 55.34$ |
| $r_{14} =$ | 4.7497 | | |
| | $d_{14} = 4.2904$ | $n_9 = 1.497$ | $v_9 = 81.14$ |
| $r_{15} =$ | −5.7355 | | |
| | $d_{15} = 1.0$ | $n_{10} = 1.596$ | $v_{10} = 39.29$ |
| $r_{16} =$ | −55.2542 | | |
| | $d_{16} = 0.15$ | | |
| $r_{17} =$ | 12.1862 | | |
| | $d_{17} = 2.2382$ | $n_{11} = 1.497$ | $v_{11} = 81.14$ |
| $r_{18} =$ | −14.3804 | | |
| | $d_{18} = 7.0$ | $n_{12} = 1.596$ | $v_{12} = 39.29$ |
| $r_{19} =$ | 7.3769 | | |
| | $d_{19} = 8.5761$ | | |
| $r_{20} =$ | −2.9707 | | |
| | $d_{20} = 2.0598$ | $n_{13} = 1.678$ | $v_{13} = 55.34$ |
| $r_{21} =$ | 11.1831 | | |
| | $d_{21} = 7.0$ | $n_{14} = 1.596$ | $v_{14} = 39.3$ |
| $r_{22} =$ | −7.1268 | | |
| (DOE) | | | |

$K = -1$, $A = 0.282845 \times 10^{-8}$, $B = -0.695088 \times 10^{-10}$,
$C = 0.643649 \times 10^{-11}$, $D = -0.321846 \times 10^{-12}$,
$D_i/D = 0.99$, $(h \times f)/(L \times I) = 0.064$,
minimum groove pitch = 130 μm

Embodiment 2 focal length=9 mm, NA=0.6 (submerged),
magnification=20, Parfocality length=45 mm,
maximum image height on specimen surface=0.25 mm

| | | | |
|---|---|---|---|
| $r_0 =$ | ∞ | | |
| | $d_0 = 0.17$ | $n_0 = 1.521$ | $v_0 = 56.02$ |
| $r_1 =$ | ∞ | | |
| | $d_1 = 0.12$ | $n_1, v_1$ | (water) |
| $r_2 =$ | ∞ | | |
| | $d_2 = 1.0$ | $n_2 = 1.516$ | $v_2 = 64.15$ |
| $r_3 =$ | ∞ | | |
| | $d_3 = 1.3056$ | | |
| $r_4 =$ | −3.8226 | | |
| | $d_4 = 1.5$ | $n_3 = 1.744$ | $v_3 = 44.79$ |
| $r_5 =$ | −96.9912 | | |
| | $d_5 = 2.2154$ | $n_4 = 1.755$ | $v_4 = 27.51$ |
| $r_6 =$ | −5.4626 | | |

-continued

| | | | |
|---|---|---|---|
| | $d_6 = 0.15$ | | |
| $r_7 =$ | −19.8772 | | |
| | $d_7 = 2.2181$ | $n_5 = 1.487$ | $v_5 = 70.21$ |
| $r_8 =$ | −6.7810 | | |
| | $d_8 = 0.15$ | | |
| $r_9 =$ | −8.6681 | | |
| | $d_9 = 1.5$ | $n_6 = 1.639$ | $v_6 = 34.48$ |
| $r_{10} =$ | 61.1760 | | |
| | $d_{10} = 3.7076$ | $n_7 = 1.487$ | $v_7 = 70.21$ |
| $r_{11} =$ | −7.8096 | | |
| | $d_{11} = 0.15$ | | |
| $r_{12} =$ | 58.3918 | | |
| | $d_{12} = 3.5924$ | $n_8 = 1.487$ | $v_8 = 70.21$ |
| $r_{13} =$ | −9.6113 | | |
| | $d_{13} = 1.5$ | $n_9 = 1.749$ | $v_9 = 34.96$ |
| $r_{14} =$ | −41.0966 | | |
| | $d_{14} = 0.15$ | | |
| $r_{15} =$ | 19.2027 | | |
| | $d_{15} = 1.5$ | $n_{10} = 1.603$ | $v_{10} = 42.32$ |
| $r_{16} =$ | 11.9017 | | |
| | $d_{16} = 3.6322$ | $n_{11} = 1.487$ | $v_{11} = 70.21$ |
| $r_{17} =$ | −76.0706 | | |
| | $d_{17} = 0.15$ | | |
| $r_{18} =$ | −800896.0617 (DOE) ($n_U = 1001$) | | |
| | $d_{18} = 0$ | | |
| $r_{19} =$ | ∞ | | |
| | $d_{19} = 2.0$ | $n_{12} = 1.516$ | $v_{12} = 64.15$ |
| $r_{20} =$ | ∞ | | |
| | $d_{20} = 14.1927$ | | |
| $r_{21} =$ | 23.9945 | | |
| | $d_{21} = 2.9486$ | $n_{13} = 1.762$ | $V_{13} = 40.1$ |
| $r_{22} =$ | −31.1050 | | |
| | $d_{22} = 1.5$ | $n_{14} = 1.487$ | $v_{14} = 70.21$ |
| $r_{23} =$ | 10.0681 | | |
| (DOE) | | | |
| $K = -1, A = 0.263441 \times 10^{-8}, B = -0.964788 \times 10^{-11},$ | | | |
| $C = -0.315285 \times 10^{-13}, D = -0.299622 \times 10^{-15}$ | | | |
| $D_1/D = 0.99, (h \times f)/(L \times I) = 0.205,$ | | | |
| minimum groove pitch = 87 μm | | | |

Embodiment 3 focal length=3.6 mm, NA=0.75,
magnification=50, Parfocality length=45 mm,
maximum image height on specimen surface=0.265 mm

| | | | |
|---|---|---|---|
| $r_0 =$ | ∞ | | |
| | $d_0 = 0.9498$ | | |
| $r_1 =$ | −2.2690 | | |
| | $d_1 = 4.0409$ | $n_1 = 1.678$ | $v_1 = 55.34$ |
| $r_2 =$ | −3.4762 | | |
| | $d_2 = 0.1$ | | |
| $r_3 =$ | 16.9526 | | |
| | $d_3 = 3.3974$ | $n_2 = 1.487$ | $v_2 = 70.21$ |
| $r_4 =$ | −9.1604 | | |
| | $d_4 = 0.1$ | | |
| $r_5 =$ | −28.7293 | | |
| | $d_5 = 1.8$ | $n_3 = 1.596$ | $v_3 = 39.29$ |
| $r_6 =$ | 6.5830 | | |
| | $d_6 = 4.4396$ | $n_4 = 1.487$ | $v_4 = 70.21$ |
| $r_7 =$ | −15.6408 | | |
| | $d_7 = 0.1$ | | |
| $r_8 =$ | ∞ | | |
| | $d_8 = 1.0$ | $n_5 = 1.516$ | $v_5 = 64.15$ |
| $r_9 =$ | ∞ | | |
| | $d_9 = 0$ | | |
| $r_{10} =$ | −5.7585 × 10⁶ (DOE) ($n_U = 10001$) | | |
| | $d_{10} = 0.1$ | | |
| $r_{11} =$ | 20.2252 | | |
| | $d_{11} = 3.6611$ | $n_6 = 1.487$ | $v_6 = 70.21$ |
| $r_{12} =$ | −10.5398 | | |
| | $d_{12} = 1.8$ | $n_7 = 1.596$ | $v_7 = 39.29$ |
| $r_{13} =$ | 10.7283 | | |
| | $d_{13} = 3.4719$ | $n_8 = 1.487$ | $v_8 = 70.21$ |
| $r_{14} =$ | −28.0713 | | |
| | $d_{14} = 9.5097$ | | |

| | | | |
|---|---|---|---|
| $r_{15} =$ | 24.5125 | | |
| | $d_{15} = 3.5584$ | $n_9 = 1.596$ | $v_9 = 39.21$ |
| $r_{16} =$ | −8.897 | | |
| | $d_{16} = 1.8$ | $n_{10} = 1.498$ | $v_{10} = 65.03$ |
| $r_{17} =$ | −18.2382 | | |
| | $d_{17} = 4.0127$ | | |
| $r_{18} =$ | −7.0308 | | |
| | $d_{18} = 1.8$ | $n_{11} = 1.498$ | $v_{11} = 65.03$ |
| $r_{19} =$ | 15.1697 | | |
| (DOE) | | | |
| $K = -1, A = 0.885874 \times 10^{-9}, B = -0.373681 \times 10^{-10},$ | | | |
| $C = 0.171463 \times 10^{-11}, D = -0.455259 \times 10^{-13}$ | | | |
| $D_1/D = 0.98, (h \times f)/(L \times I) = 0.071,$ | | | |
| minimum groove pitch = 80 μm | | | |

Embodiment 4 focal length=3.6 mm, NA=0.75,
magnification=50, Parfocality length=45 mm,
maximum image height on specimen surface=0.265 mm

| | | | |
|---|---|---|---|
| $r_0 =$ | ∞ | | |
| | $d_0 = 0.9145$ | | |
| $r_1 =$ | −2.6605 | | |
| | $d_1 = 4.1491$ | $n_1 = 1.678$ | $v_1 = 55.34$ |
| $r_2 =$ | −3.3609 | | |
| | $d_2 = 0.1$ | | |
| $r_3 =$ | 59.4216 | | |
| | $d_3 = 3.9495$ | $n_2 = 1.617$ | $v_2 = 62.8$ |
| $r_4 =$ | 4.8439 | | |
| | $d_4 = 1.8$ | $n_3 = 1.596$ | $v_3 = 39.29$ |
| $r_5 =$ | 8.9186 | | |
| | $d_5 = 4.4558$ | $n_4 = 1.439$ | $v_4 = 94.96$ |
| $r_6 =$ | −11.2459 | | |
| | $d_6 = 0.1$ | | |
| $r_7 =$ | ∞ | | |
| | $d_7 = 1.0$ | $n_5 = 1.516$ | $v_5 = 64.15$ |
| $r_8 =$ | ∞ | | |
| | $d_8 = 0$ | | |
| $r_9 =$ | −7.2979 × 10⁶ (DOE) ($n_U = 10001$) | | |
| | $d_9 = 0.1$ | | |
| $r_{10} =$ | 19.9999 | | |
| | $d_{10} = 3.4234$ | $n_6 = 1.439$ | $v_6 = 94.96$ |
| $r_{11} =$ | −21.6675 | | |
| | $d_{11} = 14.4364$ | | |
| $r_{12} =$ | 103.5371 | | |
| | $d_{12} = 6.0$ | $n_7 = 1.596$ | $v_7 = 39.29$ |
| $r_{13} =$ | −11.7643 | | |
| | $d_{13} = 3.0881$ | | |
| $r_{14} =$ | −6.5185 | | |
| | $d_{14} = 2.7072$ | $n_8 = 1.498$ | $v_8 = 65.03$ |
| $r_{15} =$ | 17.4388 | | |
| (DOE) | | | |
| $K = -1, A = 0.136333 \times 10^{-8}, B = -0.205407 \times 10^{-10},$ | | | |
| $C = 0.275330 \times 10^{-12}, D = -0.502831 \times 10^{-14}$ | | | |
| $D_1/D = 0.96, (h \times f)/(L \times I) = 0.076,$ | | | |
| minimum groove pitch = 157 μm | | | |

Embodiment 5 focal length=36 mm, NA=0.20,
magnification=10, Parfocality length=100 mm,
maximum image height on specimen surface=0.8 mm

| | | | |
|---|---|---|---|
| $r_0 =$ | ∞ | | |
| | $d_0 = 10.8729$ | | |
| $r_1 =$ | −10.1528 | | |
| | $d_1 = 7.0$ | | $SiO_2$ |
| $r_2 =$ | −12.8207 | | |
| | $d_2 = 0.2$ | | |
| $r_3 =$ | 1185.9548 | | |
| | $d_3 = 7.0$ | | $SiO_2$ |

-continued

|  |  |  |
|---|---|---|
| $r_4 =$ | $-20.8861$ | |
| | $d_4 = 9.6560$ | |
| $r_5 =$ | $166976.3323$ (DOE) ($n_U = 1001$) | |
| | $d_5 = 0$ | |
| $r_6 =$ | $\infty$ | |
| | $d_6 = 3.0$ | SiO$_2$ |
| $r_7 =$ | $\infty$ | |
| | $d_7 = 36.8382$ | |
| $r_8 =$ | $18.3786$ | |
| | $d_8 = 5.2879$ | CaF$_2$ |
| $r_9 =$ | $-14.5637$ | |
| | $d_9 = 5.2019$ | SiO$_2$ |
| $r_{10} =$ | $15.9489$ | |
| | $d_{10} = 3.5421$ | |
| $r_{11} =$ | $-9.8983$ | |
| | $d_{11} = 6.6329$ | SiO$_2$ |
| $r_{12} =$ | $-12.7649$ | |
| | $d_{12} = 0.2$ | |
| $r_{13} =$ | $-107.5879$ | |
| | $d_{13} = 3.4872$ | SiO$_2$ |
| $r_{14} =$ | $-38.6725$ | |
| $D_1/D = 0.69$, $(h \times f)/(L \times I) = 0.344$, minimum groove pitch = 8.9 μm | | |

In the numerical data listed above, the reference symbols $r_0, r_1, r_2, \ldots$ represent radii of curvature on surfaces of the respective lens elements, the reference symbols $d_0, d_1, d_2, \ldots$ designate airspaces reserved between lens surfaces, the reference symbols $n_1, n_2, \ldots$ denote refractive indices of the respective lens elements, and the reference symbols $v_1, v_2, \ldots$ represent Abbe's number of the respective lens elements.

Embodiment 6 focal length=3.6 mm, NA=0.70,
magnification=50, Parfocality length=45 mm,
maximum image height on specimen surface=0.20 mm

| | | |
|---|---|---|
| $r_0 = \infty$ | | |
| | $d_0 = 0.8660$ | |
| $r_1 = -1.9996$ | | |
| | $d_1 = 3.8538$ | fused silica |
| $r_2 = -3.0051$ | | |
| | $d_2 = 0.2$ | |
| $r_3 = -18.9946$ | | |
| | $d_3 = 2.8804$ | fused silica |
| $r_4 = -7.3945$ | | |
| | $d_4 = 0.2$ | |
| $r_5 = 65.8028$ | | |
| | $d_5 = 2.7977$ | fused silica |
| $r_6 = -16.8378$ | | |
| | $d_6 = 0.2$ | |
| $r_7 = \infty$ | | |
| | $d_7 = 1.0$ | fused silica |
| $r_8 = \infty$ | | |
| | $d_8 = 0$ | |
| $r_9 = -3.2859 \times 10^5$ (DOE1) | | |
| | $d_9 = 0.2$ | |
| $r_{10} = 16.2471$ | | |
| | $d_{10} = 2.6929$ | fused silica |
| $r_{11} = 3946.0273$ | | |
| | $d_{11} = 2.0025$ | |
| $r_{12} = \infty$ | | |
| | $d_{12} = 1.0$ | fused silica |
| $r_{13} = \infty$ | | |
| | $d_{13} = 0$ | |
| $r_{14} = 0.4222 \times 10^6$ (DOE2) | | |
| | $d_{14} = 2.3926$ | |
| $r_{15} = 9.3997$ | | |
| | $d_{15} = 5.0$ | fused silica |
| $r_{16} = 4.6739$ | | |

DOE1
K = $-1$,  A = $-0.355512 \times 10^{-8}$, B = $0.255580 \times 10^{-10}$
         C = $-0.276940 \times 10^{-12}$, D = $-0.492542 \times 10^{-15}$ DOE2
K = $-1$,  A = $0.944679 \times 10^{-8}$, B = $-0.372543 \times 10^{-10}$
         C = $-0.135587 \times 10^{-12}$, D = $0.627142 \times 10^{-13}$
IR/tl = 0.78
DOE1    $D_1/D = 1.00$,    $(h \times f)/(L \times I) = 0.106$
DOE2    $D_1/D = 0.80$,    $(h \times f)/(L \times I) = 0.027$ Embodiment 7 focal length=1.8 mm, NA=0.90,
magnification=100, Parfocality length=45 mm,
maximum image height on specimen surface=0.10 mm

| | | |
|---|---|---|
| $r_0 = \infty$ | | |
| | $d_0 = 0.5202$ | |
| $r_1 = -3.5097$ | | |
| | $d_1 = 3.9565$ | fused silica |
| $r_2 = -3.1721$ | | |
| | $d_2 = 0.2$ | |
| $r_3 = -25.5673$ | | |
| | $d_3 = 3.6571$ | fused silica |
| $r_4 = -7.7297$ | | |
| | $d_4 = 0.2$ | |
| $r_5 = \infty$ | | |
| | $d_5 = 1.0$ | fused silica |
| $r_6 = \infty$ | | |
| | $d_6 = 0$ | |
| $r_7 = 1.6281 \times 10^6$ (DOE1) | | |
| | $d_7 = 0.2$ | |
| $r_8 = 15.4510$ | | |
| | $d_8 = 5.0$ | fused silica |
| $r_9 = -16.2334$ | | |
| | $d_9 = 0.2$ | |
| $r_{10} = \infty$ | | |
| | $d_{10} = 1.0$ | fused silica |
| $r_{11} = \infty$ | | |
| | $d_{11} = 0$ | |
| $r_{12} = -3.8924 \times 10^5$ (DOE2) | | |
| | $d_{12} = 0.2$ | |
| $r_{13} = 28.6396$ | | |
| | $d_{13} = 2.8321$ | fused silica |
| $r_{14} = -91.0899$ | | |
| | $d_{14} = 3.6190$ | |
| $r_{15} = -6.8166$ | | |
| | $d_{15} = 2.0$ | fused silica |
| $r_{16} = -10.6927$ | | |
| | $d_{16} = 0.2003$ | |
| $r_{17} = 8.4376$ | | |
| | $d_{17} = 2.5850$ | fused silica |
| $r_{18} = 4.9177$ | | |
| | $d_{18} = 3.5485$ | |
| $r_{19} = \infty$ | | |
| | $d_{19} = 1.0$ | fused silica |
| $r_{20} = \infty$ | | |
| | $d_{20} = 0$ | |
| $r_{21} = 0.5853 \times 10^6$ (DOE3) | | |
| | $d_{21} = 0.2$ | |
| $r_{22} = 5.2022$ | | |
| | $d_{22} = 3.5626$ | fused silica |
| $r_{23} = 48.6437$ | | |
| | $d_{23} = 3.9752$ | |
| $r_{24} = -3.5803$ | | |
| | $d_{24} = 5.0$ | fused silica |
| $r_{25} = 23.3843$ | | |

DOE1
K = $-1$,  A = $-0.586575 \times 10^{-8}$, B = $0.105584 \times 10^{-10}$
         C = $-0.114914 \times 10^{-11}$, D = $0.438189 \times 10^{-13}$
DOE2
K = $-1$,  A = $0.315284 \times 10^{-8}$, B = $-0.139031 \times 10^{-10}$
         C = $0.111483 \times 10^{-11}$, D = $-0.324566 \times 10^{-13}$
DOE3
K = $-1$,  A = $-0.157706 \times 10^{-8}$, B = $-0.411489 \times 10^{-9}$
         C = $0.764800 \times 10^{-11}$, D = $-0.118926 \times 10^{-11}$
IR/tl = 0.80
DOE1    $D_1/D = 0.90$,    $(h \times f)/(L \times I) = 0.045$

| | | |
|---|---|---|
| DOE2 | $D_1/D = 0.95$, | $(h \times f)/(L \times I) = 0.019$ |
| DOE3 | $D_1/D = 0.52$, | $(h \times f)/(L \times I) = 0.086$ |

Embodiment 8 focal length=3.6 mm, NA=0.90,
magnification=100, Parfocality length=100 mm,
maximum image height on specimen surface=0.10 mm

| | | |
|---|---|---|
| $r_0 = \infty$ | | |
| | $d_0 = 0.8232$ | |
| $r_1 = -4.5891$ | | |
| | $d_1 = 4.2051$ | fused silica |
| $r_2 = -3.5905$ | | |
| | $d_2 = 0.15$ | |
| $r_3 = -18.1769$ | | |
| | $d_3 = 3.4758$ | fused silica |
| $r_4 = -8.6006$ | | |
| | $d_4 = 0.15$ | |
| $r_5 = -42.4203$ | | |
| | $d_5 = 2.8290$ | fused silica |
| $r_6 = -18.3477$ | | |
| | $d_6 = 0.15$ | |
| $r_7 = \infty$ | | |
| | $d_7 = 1.0$ | fused silica |
| $r_8 = \infty$ | | |
| | $d_8 = 0$ | |
| $r_9 = -4.6500 \times 10^5$ (DOE1) | | |
| | $d_9 = 2.3380$ | |
| $r_{10} = 18.6150$ | | |
| | $d_{10} = 6.8566$ | fused silica |
| $r_{11} = -70.6680$ | | |
| | $d_{11} = 0.4264$ | |
| $r_{12} = -684.8949$ | | |
| | $d_{12} = 2.0$ | fused silica |
| $r_{13} = 31.2416$ | | |
| | $d_{13} = 4.6278$ | |
| $r_{14} = -9.5514$ | | |
| | $d_{14} = 2.0$ | fused silica |
| $r_{15} = -14.7720$ | | |
| | $d_{15} = 0.15$ | |
| $r_{16} = \infty$ | | |
| | $d_{16} = 1.0$ | fused silica |
| $r_{17} = \infty$ | | |
| | $d_{17} = 0$ | |
| $r_{18} = 2.3143 \times 10^7$ (DOE2) | | |
| | $d_{18} = 0.15$ | |
| $r_{19} = 118.9395$ | | |
| | $d_{19} = 3.0545$ | fused silica |
| $r_{20} = -24.0674$ | | |
| | $d_{20} = 6.0351$ | |
| $r_{21} = 18.8858$ | | |
| | $d_{21} = 5.9248$ | fused silica |
| $r_{22} = \infty$ | | |
| | $d_{22} = 0$ | |
| $r_{23} = -3.6009 \times 10^6$ (DOE3) | | |
| | $d_{23} = 0.15$ | |
| $r_{24} = 16.4878$ | | |
| | $d_{24} = 3.3455$ | fused silica |
| $r_{25} = 151.2259$ | | |
| | $d_{25} = 2.0635$ | |
| $r_{26} = -9.6929$ | | |
| | $d_{26} = 3.2223$ | fused silica |
| $r_{27} = 8.6410$ | | |
| | $d_{27} = 6.0496$ | |
| $r_{28} = -9.5754$ | | |
| | $d_{28} = 6.2379$ | fused silica |
| $r_{29} = -136.3117$ | | |
| | $d_{29} = 25.9711$ | |
| $r_{30} = -22.5706$ | | |
| | $d_{30} = 7.00$ | fused silica |
| $r_{31} = -18.2056$ | | |

DOE1
$K = -1$, $A = -0.978136 \times 10^{-9}$, $B = -0.552784 \times 10^{-11}$
$C = -0.151562 \times 10^{-12}$, $D = 0.142616 \times 10^{-14}$ DOE2
$K = -1$, $A = 0.405846 \times 10^{-9}$, $B = 0.125266 \times 10^{-10}$
$C = 0.161396 \times 10^{-12}$, $D = -0.142574 \times 10^{-15}$ DOE3
$K = -1$, $A = 0.232811 \times 10^{-8}$, $B = 0.742643 \times 10^{-11}$
$C = -0.309069 \times 10^{-13}$, $D = 0.731189 \times 10^{-14}$
$|R/t| = 0.85$

| | | |
|---|---|---|
| DOE1 | $D_1/D = 0.98$, | $(h \times f)/(L \times I) = 0.033$ |
| DOE2 | $D_1/D = 0.81$, | $(h \times f)/(L \times I) = 0.042$ |
| DOE3 | $D_1/D = 0.64$, | $(h \times f)/(L \times I) = 0.106$ |

Embodiment 9 focal length=3.6 mm, NA=0.90,
magnification=100, Parfocality length=100 mm,
maximum image height on specimen surface=0.10 mm

| | | |
|---|---|---|
| $r_0 = \infty$ | | |
| | $d_0 = 0.8755$ | |
| $r_1 = -4.8102$ | | |
| | $d_1 = 5.3204$ | fused silica |
| $r_2 = -4.3657$ | | |
| | $d_2 = 0.1573$ | |
| $r_3 = -11.9270$ | | |
| | $d_3 = 3.8504$ | fused silica |
| $r_4 = -8.2848$ | | |
| | $d_4 = 0.15$ | |
| $r_5 = -24.8350$ | | |
| | $d_5 = 3.6041$ | fused silica |
| $r_6 = -24.6366$ | | |
| | $d_6 = 0.15$ | |
| $r_7 = \infty$ | | |
| | $d_7 = 1.0$ | fused silica |
| $r_8 = \infty$ | | |
| | $d_8 = 0$ | |
| $r_9 = -4.8658 \times 10^5$ (DOE) | | |
| | $d_9 = 1.4144$ | |
| $r_{10} = 24.4149$ | | |
| | $d_{10} = 6.9009$ | fused silica |
| $r_{11} = -27.4833$ | | |
| | $d_{11} = 1.2232$ | |
| $r_{12} = -106.5697$ | | |
| | $d_{12} = 2.0$ | fused silica |
| $r_{13} = 27.2764$ | | |
| | $d_{13} = 6.6174$ | |
| $r_{14} = -10.4558$ | | |
| | $d_{14} = 2.8083$ | fused silica |
| $r_{15} = -16.1963$ | | |
| | $d_{15} = 0.8542$ | |
| $r_{16} = 168.5767$ | | |
| | $d_{16} = 4.1096$ | fused silica |
| $r_{17} = -22.5842$ | | |
| | $d_{17} = 0.15$ | |
| $r_{18} = 17.4537$ | | |
| | $d_{18} = 4.0673$ | fused silica |
| $r_{19} = 344.2078$ | | |
| | $d_{19} = 0.15$ | |
| $r_{20} = 16.7564$ | | |
| | $d_{20} = 3.7221$ | fused silica |
| $r_{21} = 71.3470$ | | |
| | $d_{21} = 2.7494$ | |
| $r_{22} = -17.0797$ | | |
| | $d_{22} = 2.4919$ | fused silica |
| $r_{23} = 8.7006$ | | |
| | $d_{23} = 8.1241$ | |
| $r_{24} = 253.5226$ | | |
| | $d_{24} = 4.9548$ | fused silica |
| $r_{25} = 7.7408$ | | |
| | $d_{25} = 29.8340$ | |
| $r_{26} = -13.6864$ | | |
| | $d_{26} = 4.102532$ | fused silica |
| $r_{27} = -13.1893$ | | |

DOE
$K = -1$, $A = -0.136158 \times 10^{-9}$, $B = -0.377494 \times 10^{-14}$
$C = -0.369325 \times 10^{-14}$, $D = 0.323198 \times 10^{-16}$ -continued

| | | |
|---|---|---|
| IR/tl = 0.82 | | |
| DOE | $D_1/D = 0.96$, | $(h \times f)/(L \times I) = 0.042$ |

In the numerical data listed above, the reference symbol $r_0$ represent an object surface. In the numerical data of the first and second embodiments which are configured as water-immersion type objective lens systems, the reference symbols $n_0$ and $v_0$ represent a refractive index and an Abbe's number respectively of a cover glass plate, and the reference symbols $n_1$ and $v_1$ designate a refractive index and an Abbe's number respectively of water. In the numerical data of the third through fifth embodiments, the reference symbol $d_0$ denotes a working distance. Further, DOE is an abbreviation of a diffractive optical element having a diffractive surface on which grooves are formed at a pitch d determined by the formula (14).

Out of the embodiments described above, each of the first through fifth embodiments comprises at least one diffractive optical element and at least one cemented lens component.

The first embodiment, second embodiment, third embodiments and fourth embodiment have the compositions illustrated in FIG. 1, FIG. 4, FIG. 7 and FIG. 10 respectively. The diffractive optical elements used in these embodiments exhibit effects which are equivalent to those obtainable with aspherical surfaces, and favorably correct spherical aberration, coma and so on. In the fifth embodiment which has the composition shown in FIG. 13, the diffractive optical element need not have an effect equivalent to that of an aspherical surface and is used for correcting chromatic aberration only since the objective lens system has a small numerical aperture and a low magnification.

Out of the first through fifth embodiments, the first embodiment comprises two cemented lens components each consisting of three lens elements and two doublets, and a diffractive optical element disposed between the two cemented lens components each consisting of the three lens elements. That is to say, the first embodiment is an objective lens system comprising, in order from the object side, a positive lens component, a positive meniscus lens component, a positive cemented lens component composed of three lens elements, a diffractive optical element, a positive cemented lens component composed of three lens elements and two cemented doublets as shown in FIG. 1.

The second embodiment is an objective lens system which comprises a cemented meniscus lens component having a convex surface on the image side, a meniscus lens component having a convex surface on the image side and four doublets. That is to say, the second embodiment is an objective lens system comprising, in order from the object side, a cemented doublet having a concave surface on the object side, a positive meniscus lens component having a convex surface on the image side, a cemented doublet having a concave surface on the object side, a biconvex cemented doublet, a biconvex cemented doublet, a diffractive optical element and a cemented doublet having a concave surface on the image side.

The third embodiment comprises a cemented lens component composed of three lens elements, and two cemented doublets, and a diffractive optical element is disposed between the cemented lens component composed of the three lens elements and the cemented doublet. That is to say, the third embodiment is an objective lens system comprising, in order from the object side, a meniscus lens component having a concave surface on the object side, a biconvex lens component, a cemented doublet, a diffractive optical element, a cemented lens component consisting of three lens elements, a cemented doublet and a biconcave lens component as shown in FIG. 7.

The fourth embodiment is an objective lens system which comprises a meniscus lens component, a cemented lens component consisting of three lens elements, positive lens components and a negative lens component, and a diffractive optical element is disposed on the image side of the cemented lens component consisting of the three lens elements. That is to say, the third embodiment comprises, in order from the object side, a single meniscus lens component having a concave surface on the object side, a cemented lens component composed of three lens elements, a diffractive optical element, a biconvex lens component, a positive lens component and a biconcave lens component as shown in FIG. 10.

Figure 3A:
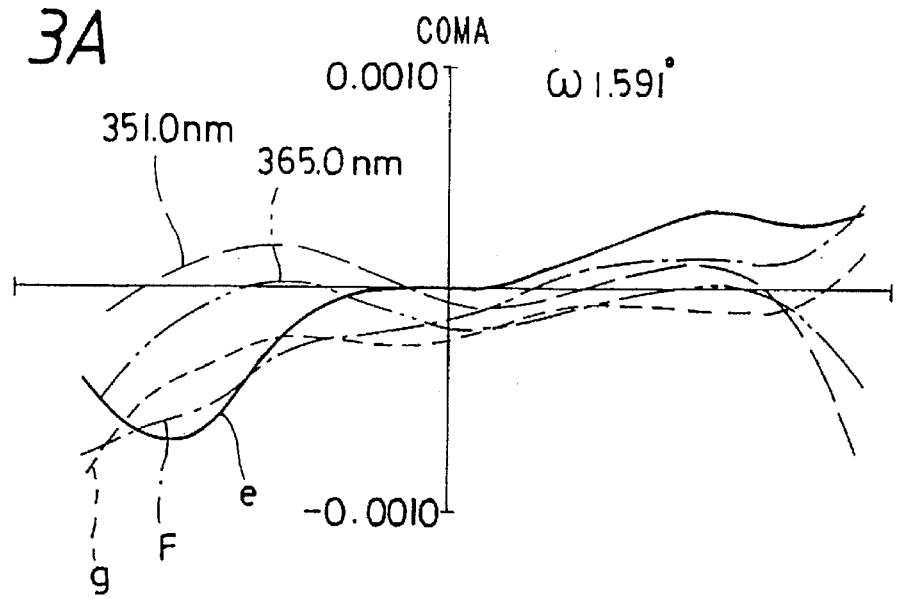
FIG. 3A, FIG. 3B and FIG. 3C show graphs illustrating coma in the first embodiment of the present invention.
Figure 3B:
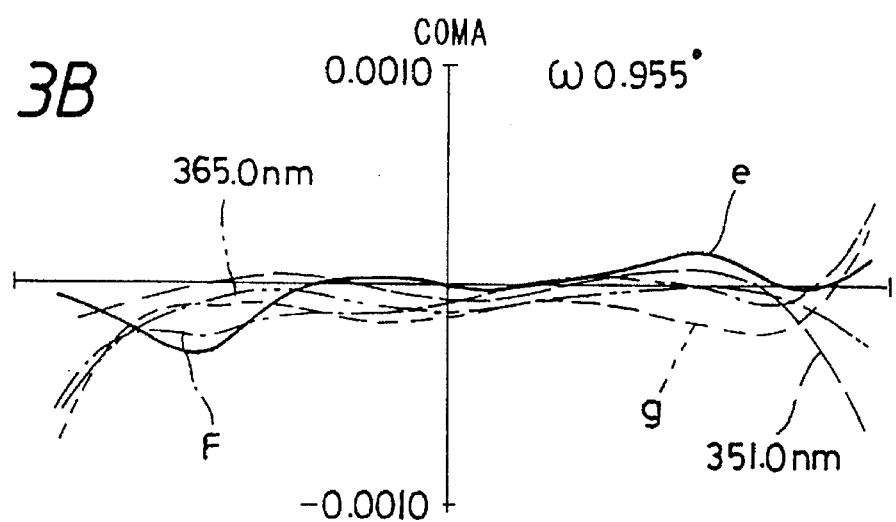
Figure 3C:
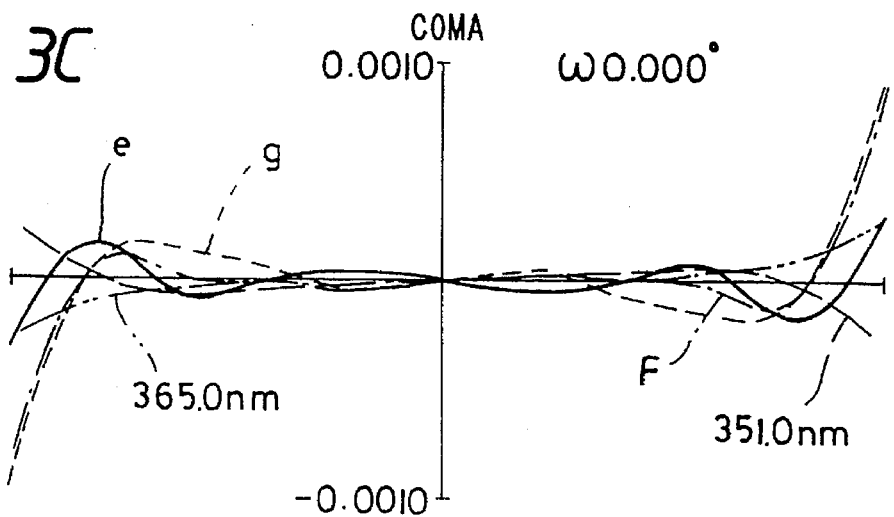
Figure 4:
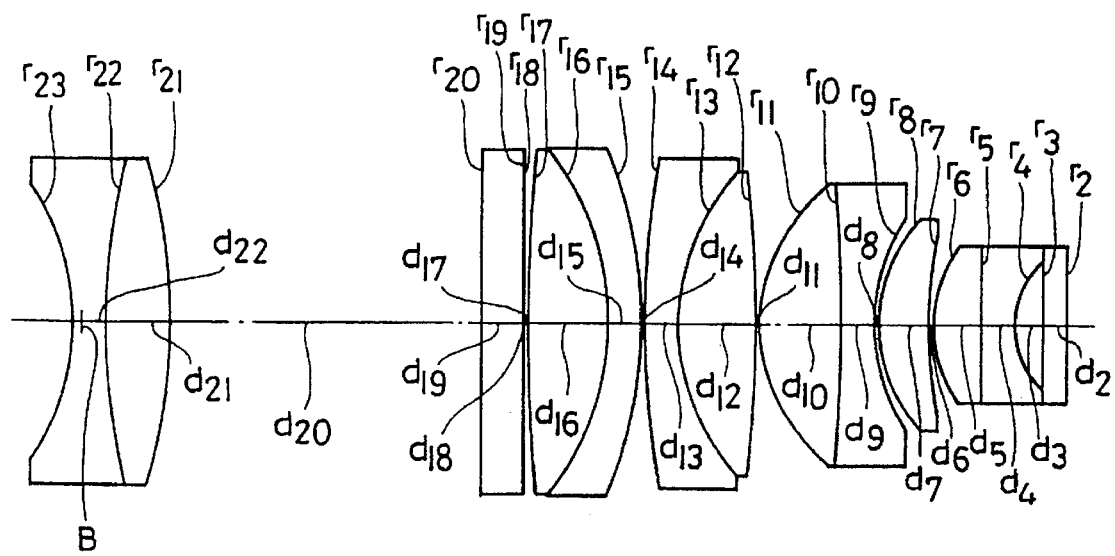
FIG. 4 shows a sectional view illustrating a composition of a second embodiment of the objective lens system according to the present invention.
Figure 5A:
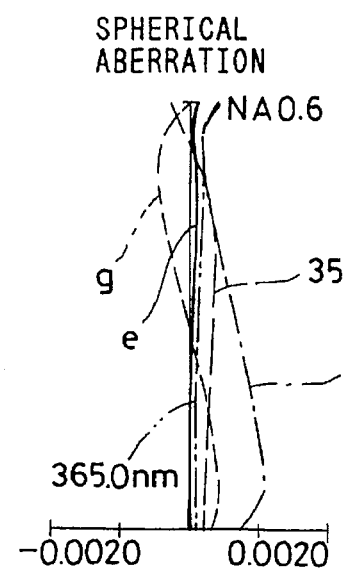
FIG. 5A, FIG. 5B and FIG. 5C show curves visualizing spherical aberration, astigmatism and distortion in the second embodiment of the present invention.
Figure 5B:
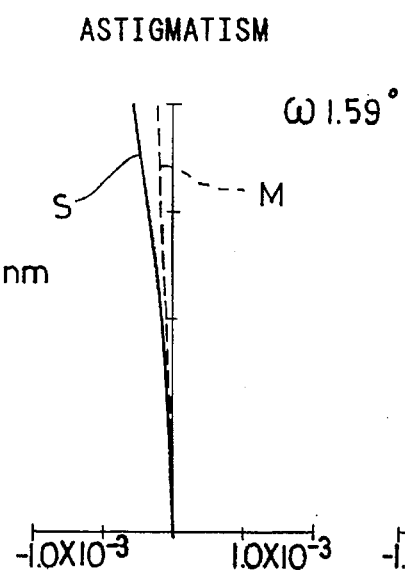
Figure 5C:
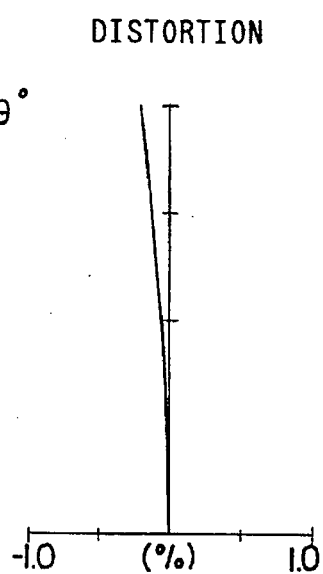
Figure 6A:
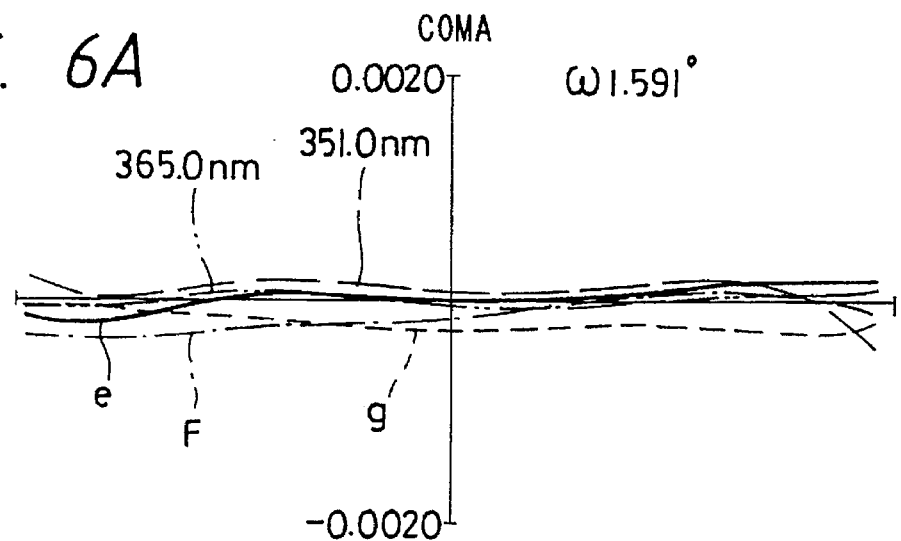
FIG. 6A, FIG. 6B and FIG. 6C show graphs illustrating coma in the second embodiment of the present invention.
Figure 6B:
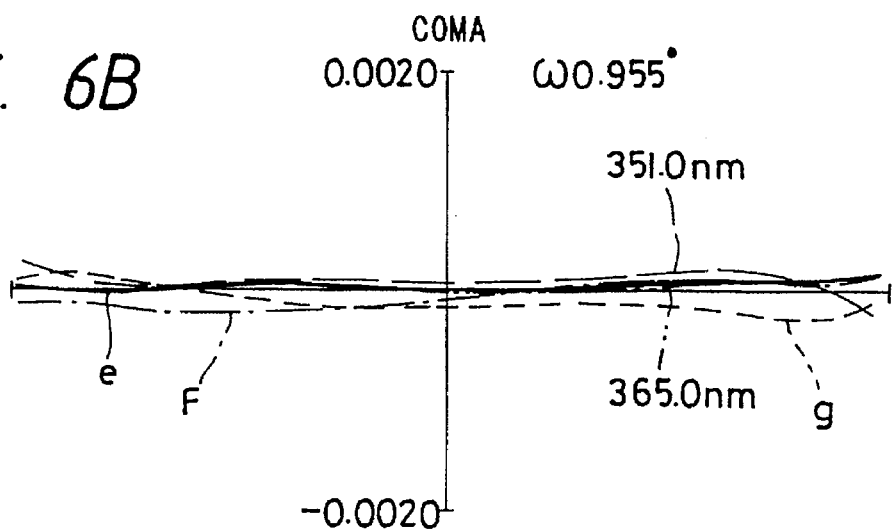
Figure 6C:
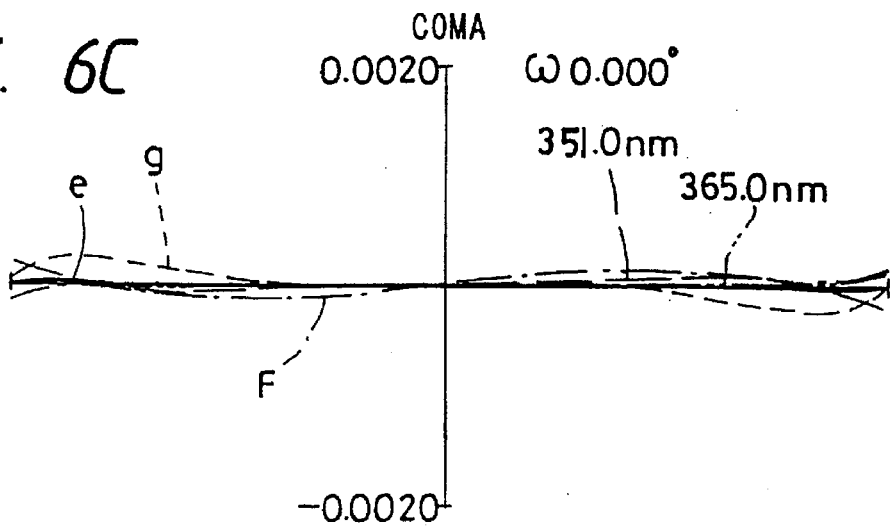
Figure 9A:
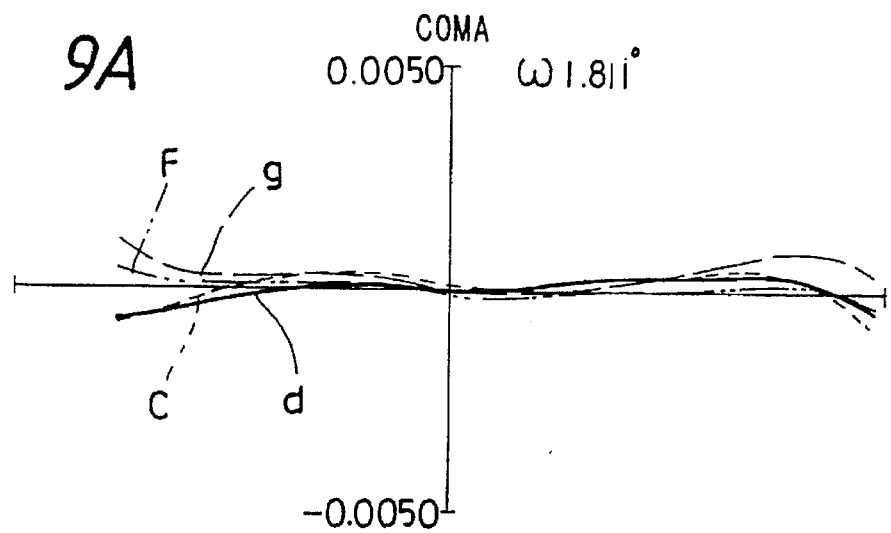
FIG. 9A, FIG. 9B and FIG. 9C show graphs illustrating coma in the third embodiment of the present invention.
Figure 9B:
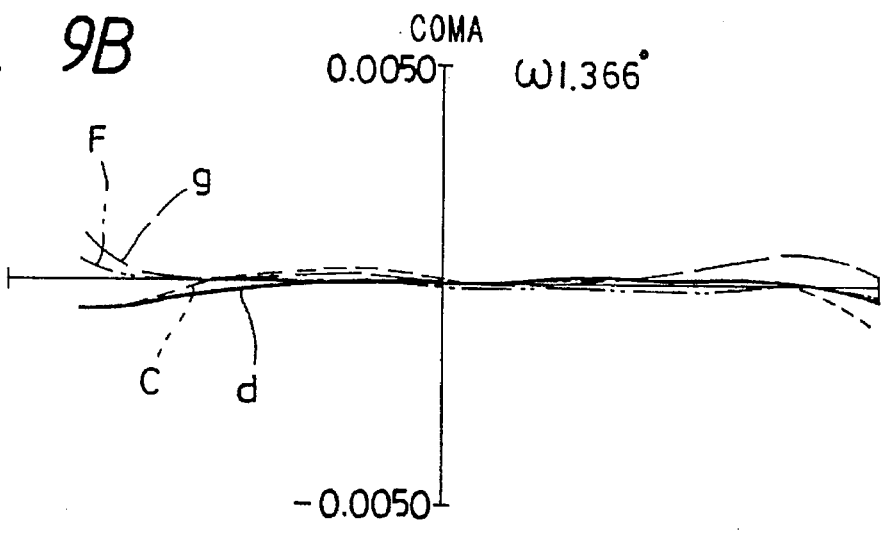
Figure 9C:
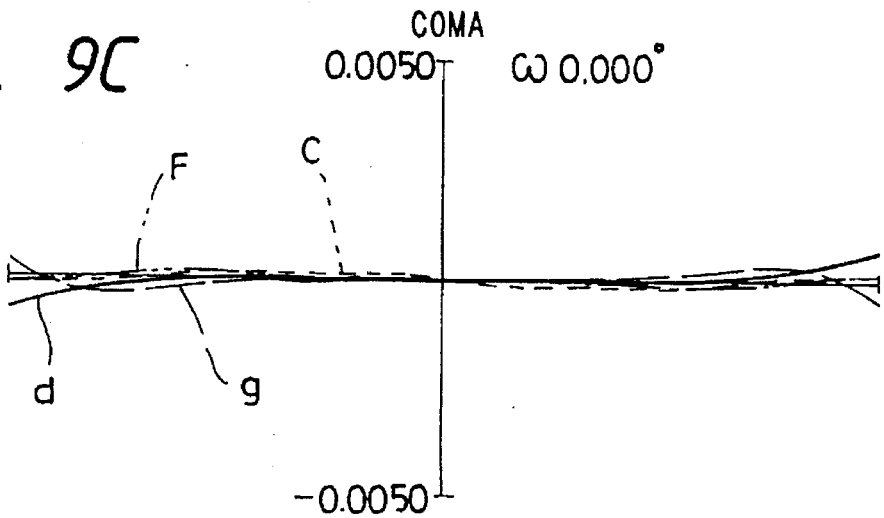
Figure 12A:
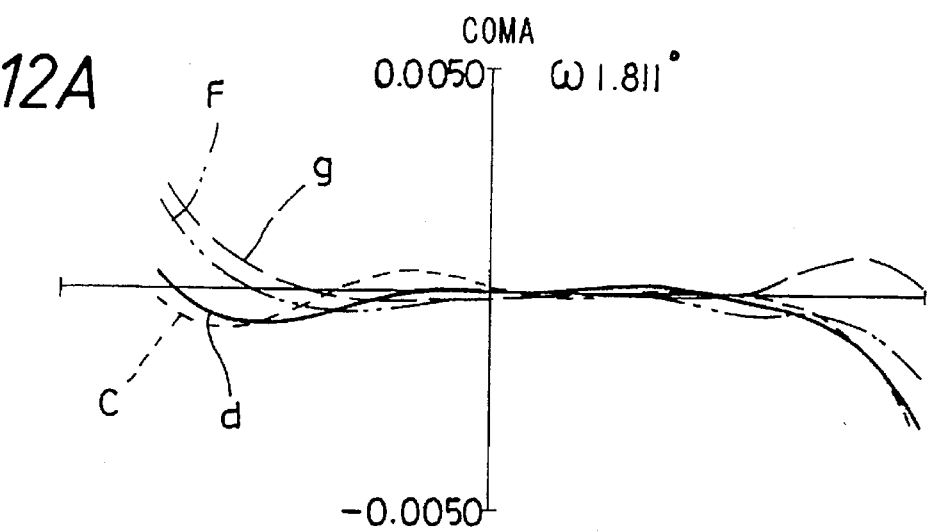
FIG. 12A, FIG. 12B and FIG. 12C show graphs illustrating coma in the fourth embodiment of the present invention.
Figure 12B:
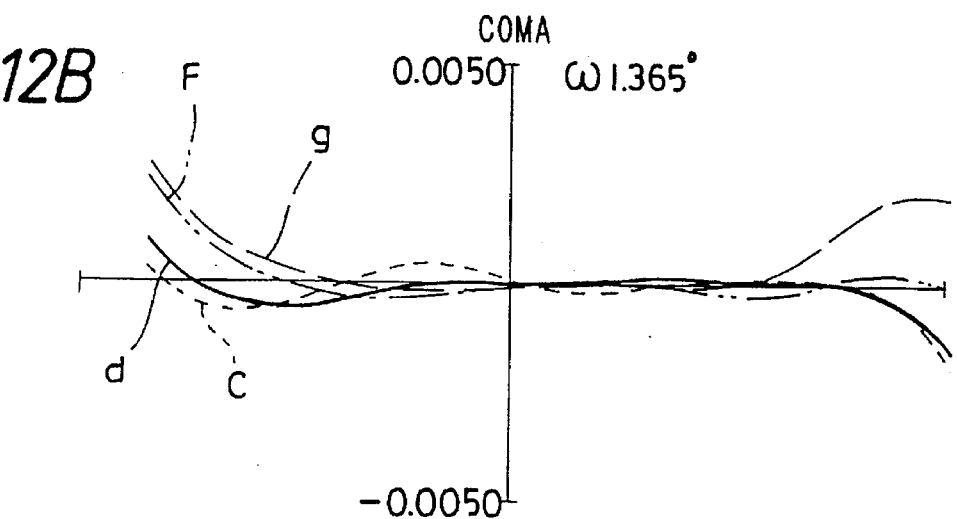
Figure 12C:
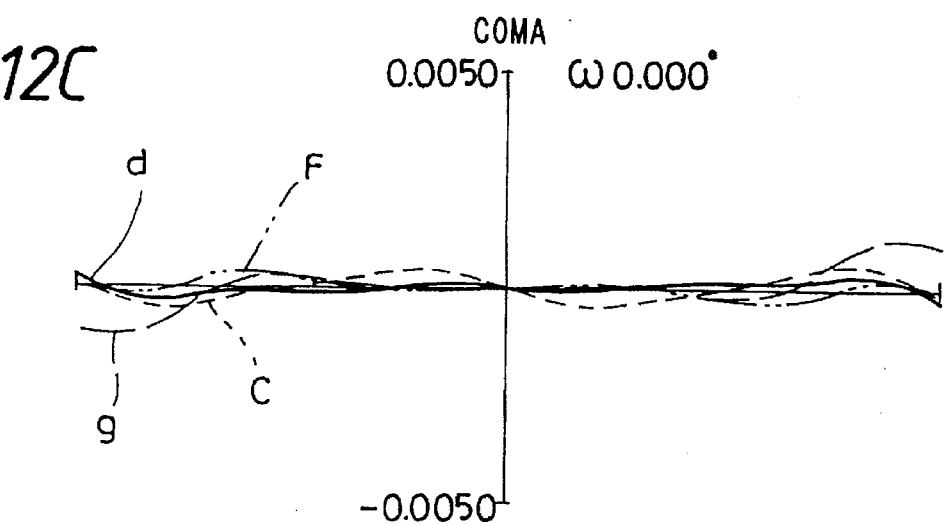
Figure 13:
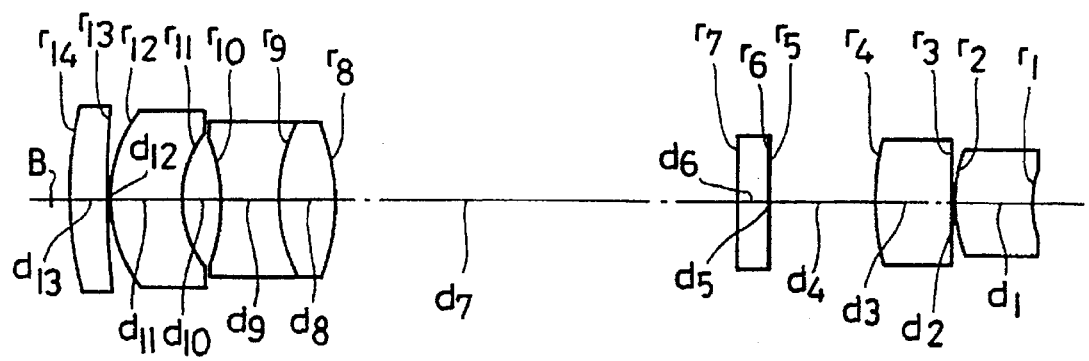
FIG. 13 shows a sectional view illustrating a composition of a fifth embodiment of the objective lens system according to the present invention.
Figures 14A, 14B, 14C:
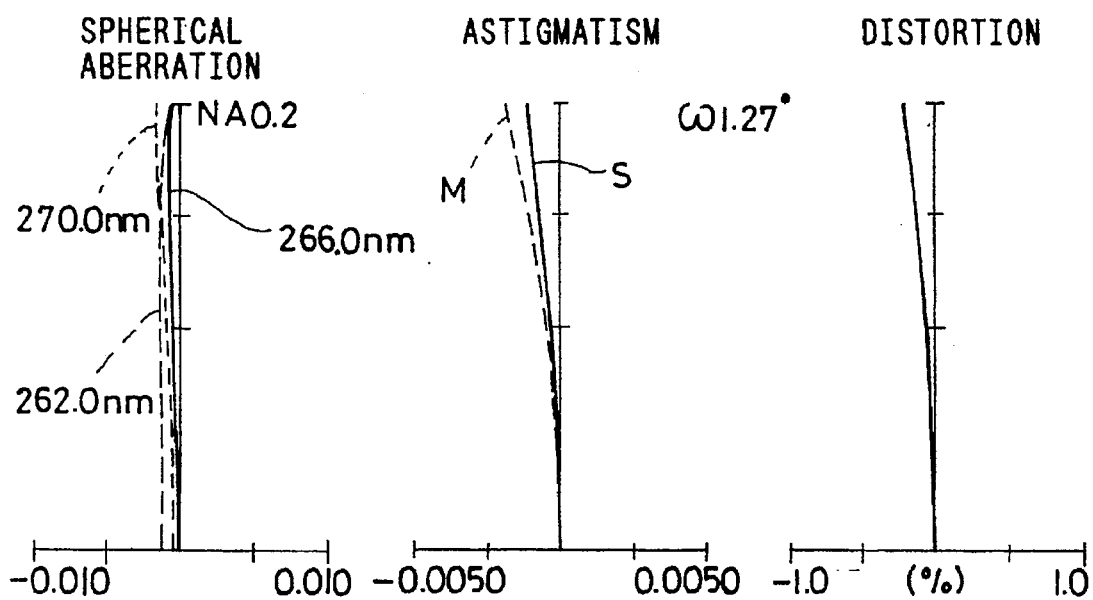
FIG. 14A, FIG. 14B and FIG. 14C show graphs visualizing spherical aberration, astigmatism and distortion in the fifth embodiment of the present invention.
Figure 15A:
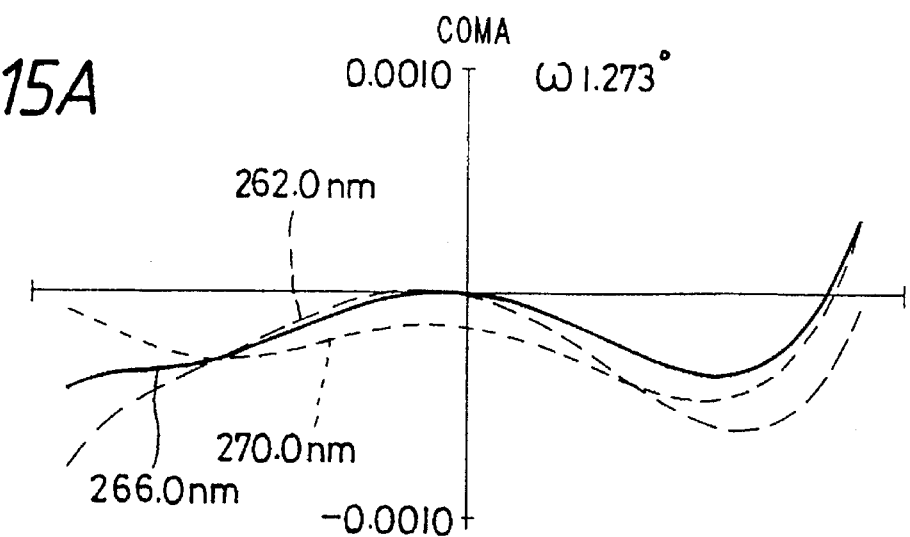
FIG. 15A, FIG. 15B and FIG. 15C show curves illustrating coma in the fifth embodiment of the present invention.
Figure 15B:
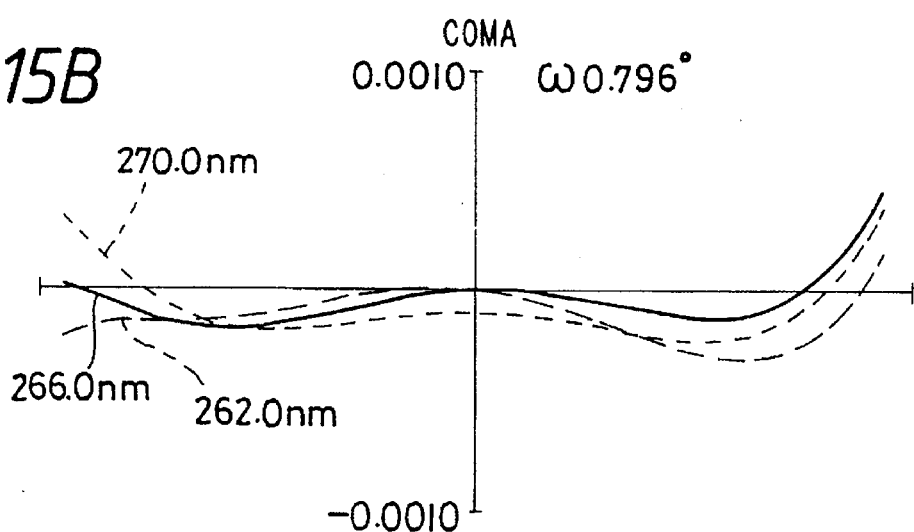
Figure 15C:
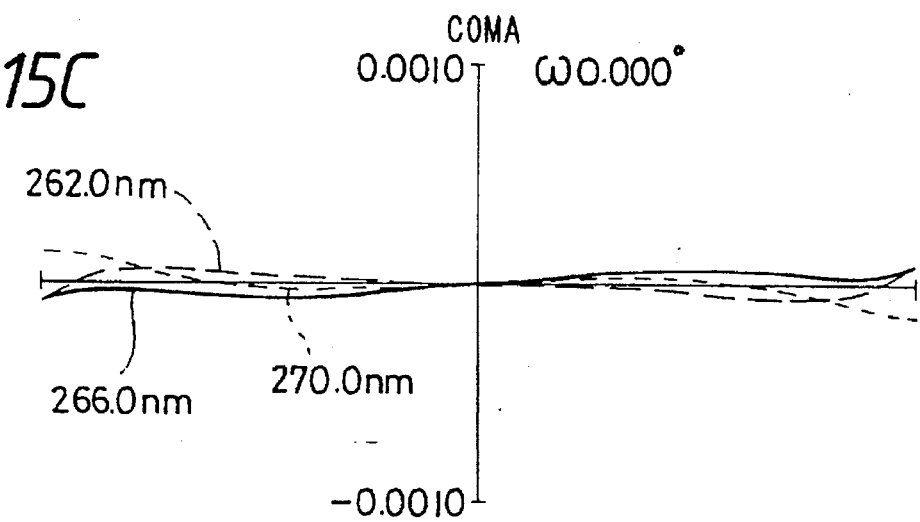

The fifth embodiment is an objective lens system which comprises, in order from the object side, two lens components, a diffractive optical element, a cemented doublet consisting of a lens element made of fused silica and a lens element made of fluorite, and two lens components as illustrated in FIG. 13.

The first embodiment is configured so as to correct chromatic aberration within a range from the near ultraviolet region to the visible region and uses the diffractive optical element located at a position at which a light bundle has a large diameter for correcting longitudinal chromatic aberration. The second embodiment is configured so as to correct chromatic aberration within a range from the near ultraviolet region to the visible region and selects for the diffractive optical element a location at which a light bundle has a large diameter and the principal ray has a large height for correcting longitudinal chromatic aberration and lateral chromatic aberration with the single diffractive optical element. The third embodiment is an objective lens system configured so as to correct chromatic aberration in the visible region, and the fourth embodiment is also configured so as to correct both the longitudinal chromatic aberration and the lateral chromatic aberration are corrected with a single diffractive optical element. In the fifth embodiment, the lateral chromatic aberration is corrected mainly with the diffractive optical element, whereas the longitudinal chromatic aberration is corrected with the cemented doublet consisting of the lens element made of fused silica and the lens element made of fluorite.

Each of the sixth through ninth embodiment is composed of a first lens unit having a positive refractive power and a second lens unit comprising at least one diffractive optical element. The sixth embodiment and the seventh embodiment have the compositions illustrated in FIG. 16 and FIG. 19 respectively, and are configured as objective lens systems for laser scanning microscopes (LSM's) in which all of the refractive lens elements are made of fused silica, and chromatic aberration is corrected at two wavelengths of 441 nm and 325 nm. Out of these embodiments, the sixth embodiment uses two diffractive optical elements: DOE1 which function to correct mainly the longitudinal chromatic aberration and the lateral chromatic aberration; and DOE2 which serves for correcting residual longitudinal chromatic aberration. The sixth embodiment has a contact surface at a location 19.7143 mm distance on the image side from the surface $r_{16}$. The seventh embodiment uses three diffractive optical elements: DOE1 and DOE2 which function to correct mainly the longitudinal chromatic aberration; and DOE3 which serves for correcting the lateral chromatic aberration. The seventh embodiment has a contact surface at a location 0.3434 mm distant on the image side from the surface $r_{25}$.

Figure 16:
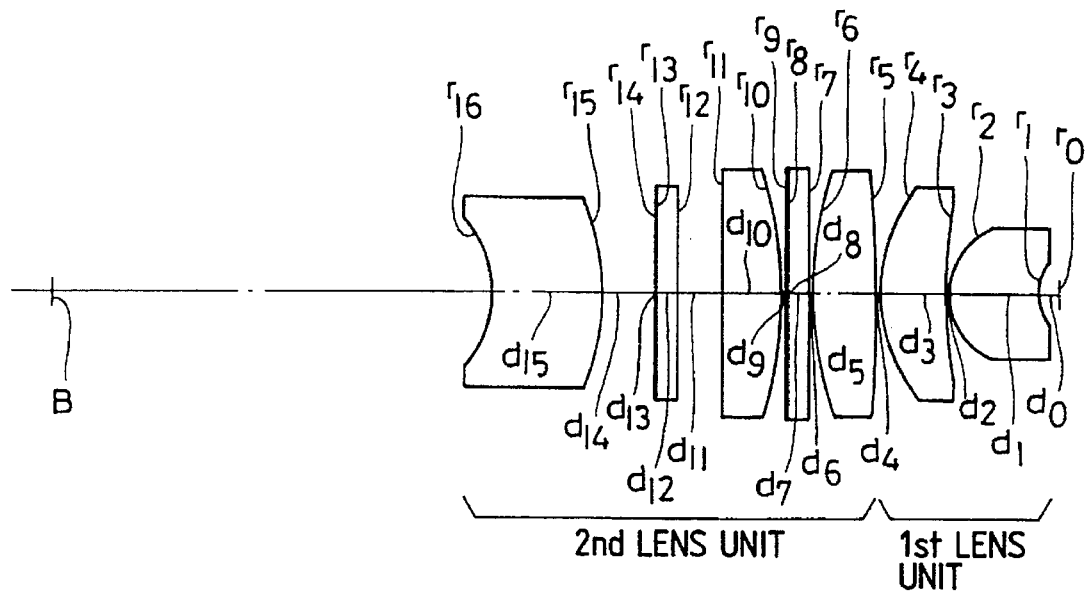
FIG. 16 shows a sectional view illustrating a composition of a sixth embodiment of the objective lens system according to the present invention.
Figure 17A:
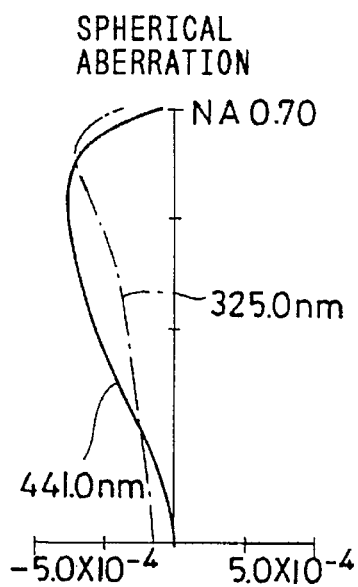
FIG. 17A, FIG. 17B and FIG. 17C show graphs visualizing spherical aberration, astigmatism and distortion in the sixth embodiment of the present invention.
Figure 17B:
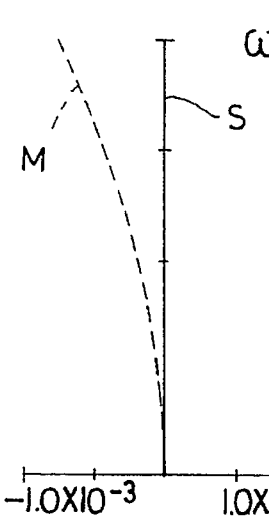
Figure 17C:
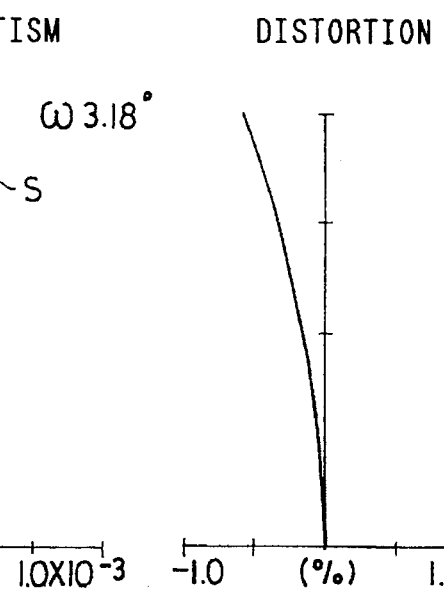
Figure 18A:
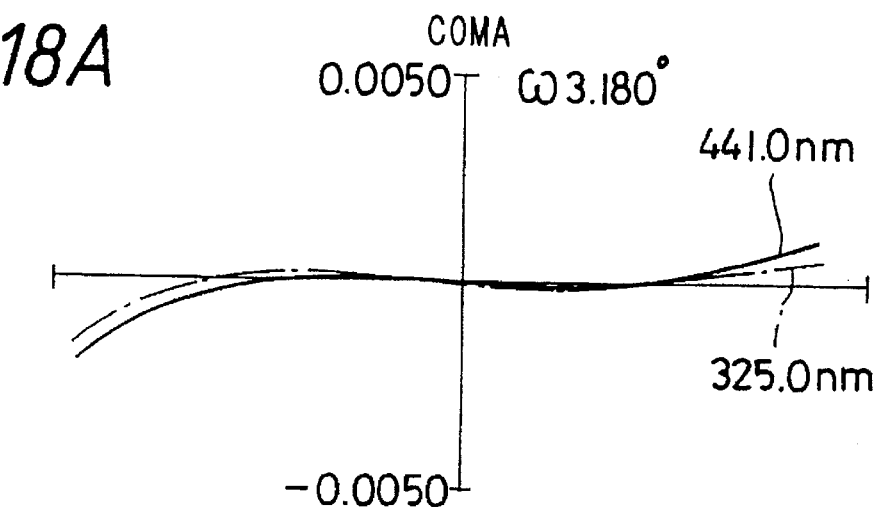
FIG. 18A, FIG. 18B and FIG. 18C show curves illustrating coma in the sixth embodiment of the present invention.
Figure 18B:
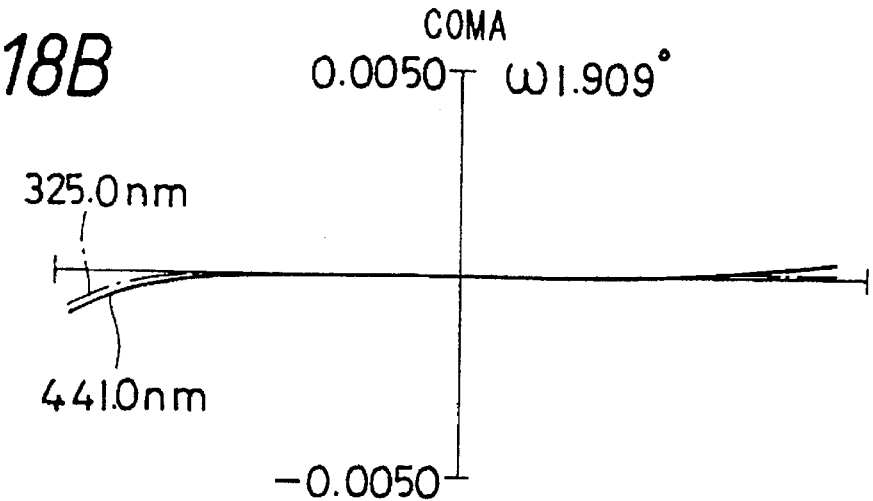
Figure 18C:
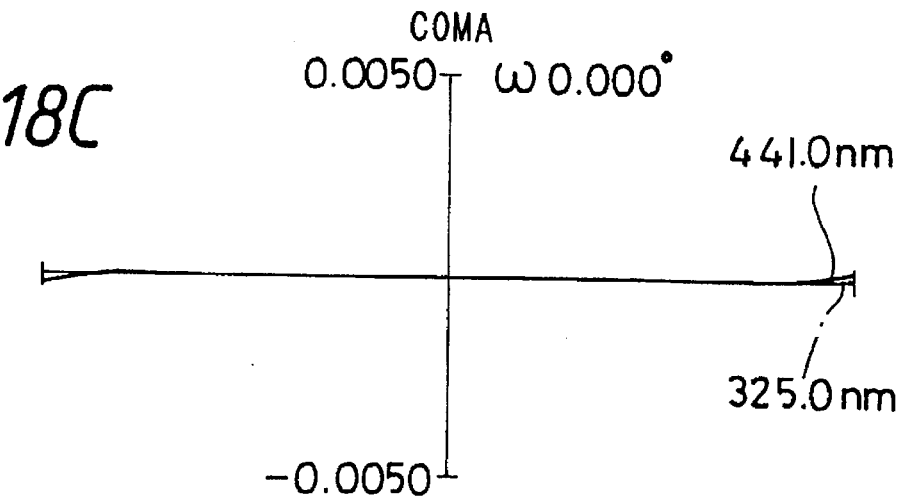
Figure 21A:
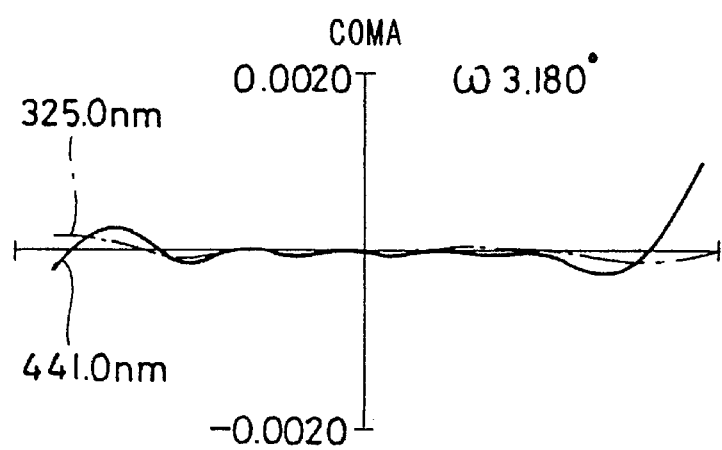
FIG. 21A, FIG. 21B and FIG. 21C show curves illustrating coma in the seventh embodiment of the present invention.
Figure 21B:
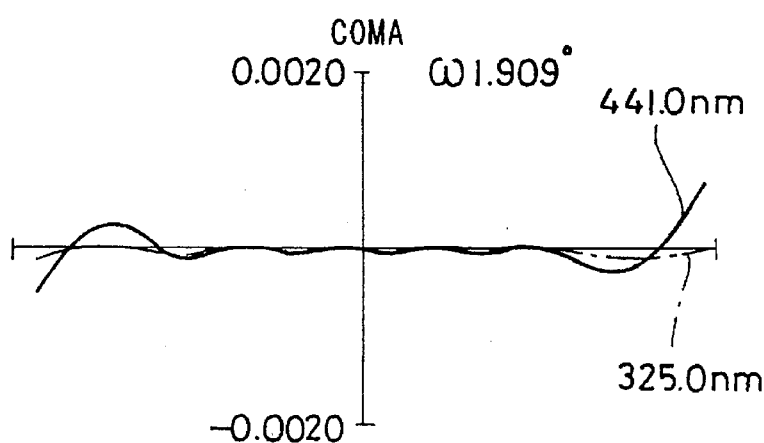
Figure 21C:
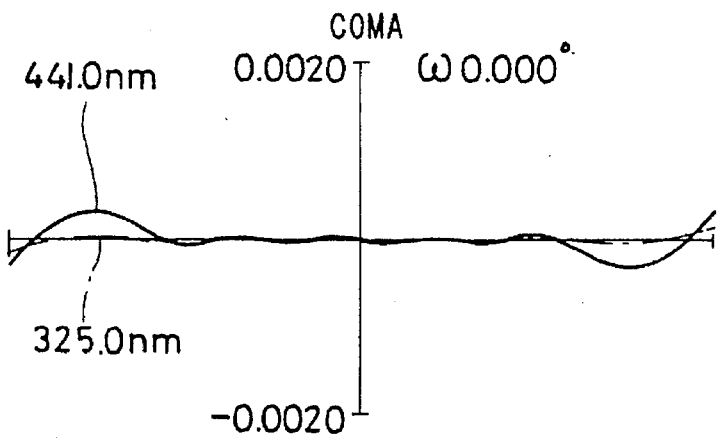

Out of the sixth through ninth embodiments, the sixth embodiment is an objective lens system which comprises lens components made of fused silica and a plurality of diffractive optical elements. Speaking more concretely, the sixth embodiment consists, in order from the object side: a first lens unit which is composed of a meniscus lens component having a concave surface on the object side and a meniscus lens component; and a second lens unit which is composed of a biconvex lens component, a diffractive optical element, a positive lens component, a diffractive optical element and a meniscus lens component as illustrated in FIG. 16, these lens components being made of fused silica.

The seventh embodiment is an objective lens system comprising lens components made of fused silica and three diffractive optical elements. In the seventh embodiment, a positive lens component is disposed between the two diffractive optical elements located on the object side and two meniscus lens components which have convex surface opposed to each other are disposed between the two diffractive optical elements located on the image side. That is to say, the seventh embodiment is an objective lens system comprising, in order from the object side: a first lens unit which consists of a meniscus lens component having a concave surface on the object side and a meniscus lens component; and a second lens unit which consists of a diffractive optical element, a biconvex lens component, a diffractive optical element, a positive lens component, two meniscus lens components having convex surfaces opposed to each other, a diffractive optical element and a biconcave lens component as illustrated in FIG. 19, all of these lens components being made of fused silica.

The eighth embodiment is an objective lens system comprising two meniscus lens components which have concave surfaces opposed to each other and are disposed between two diffractive optical elements. Speaking more concretely, the eighth embodiment consists, in order from the object side: of a first lens unit which is composed of a meniscus lens component having a concave surface on the object side and two meniscus lens components, and a second lens unit which is composed of a diffractive optical element, a positive lens component, two meniscus lens components having concave surfaces opposed to each other, a diffractive optical element, a positive lens component, a plano-convex lens component, a diffractive optical element disposed on the planar surface of the plano-convex lens component, a meniscus lens component, a biconcave lens component, a negative meniscus lens component and a positive meniscus lens component as illustrated in FIG. 22, all of these lens components being made of fused silica.

The ninth embodiment comprises a single diffractive optical element and lens components made of fused silica. Speaking more concretely, the ninth embodiment is an objective lens system consisting, in order from the object side: a first lens unit which is composed of a meniscus lens component having a concave surface on the object side and two meniscus lens components, and a second lens unit which is composed of a diffractive optical element, a biconvex lens component, a biconcave lens component, a meniscus lens component, a biconvex lens component, two meniscus lens components, a biconcave lens component, a meniscus lens component and a meniscus lens component as shown in FIG. 25, all of these lens components being made of fused silica.

Figure 22:
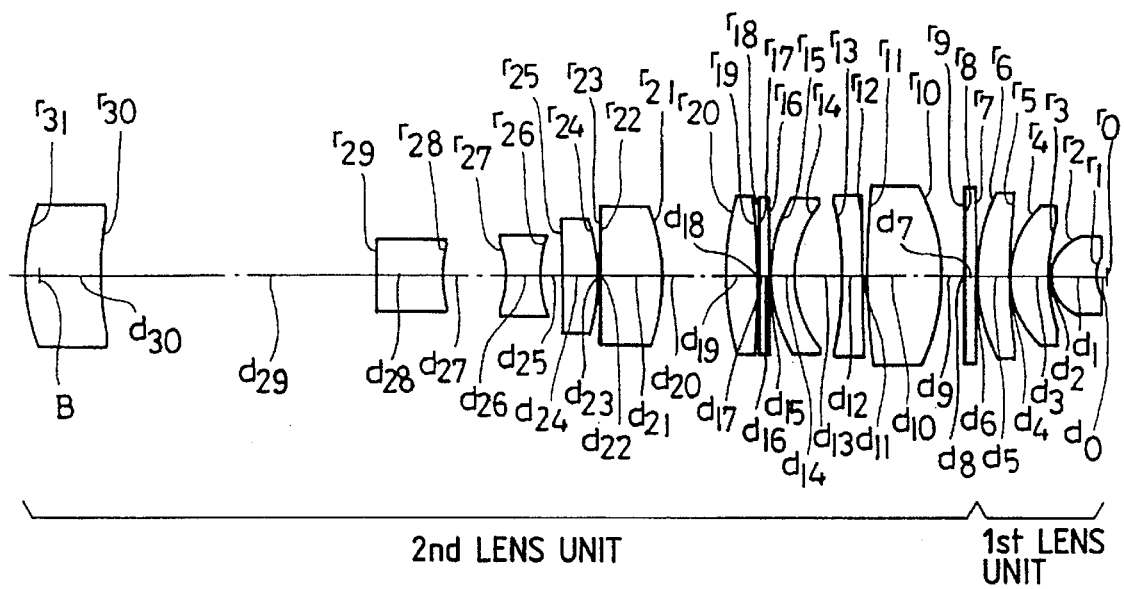
FIG. 22 shows a sectional view illustrating a composition of an eighth embodiment of the objective lens system according to the present invention.
Figure 23A:
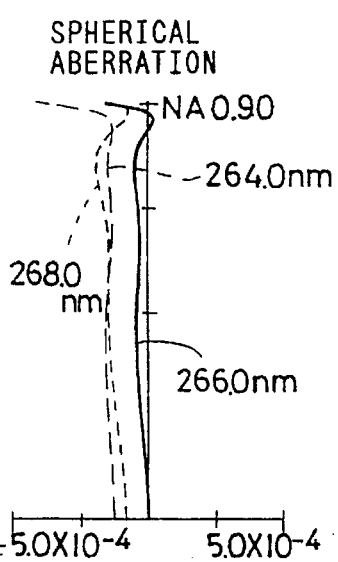
FIG. 23A, FIG. 23B and FIG. 23C show graphs illustrating spherical aberration, astigmatism and distortion in the eighth embodiment of the present invention.
Figure 23B:
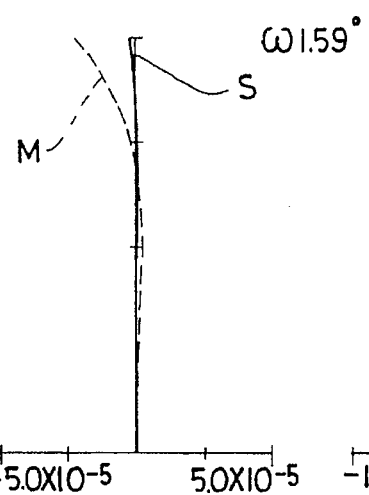
Figure 23C:
Figure 24A:
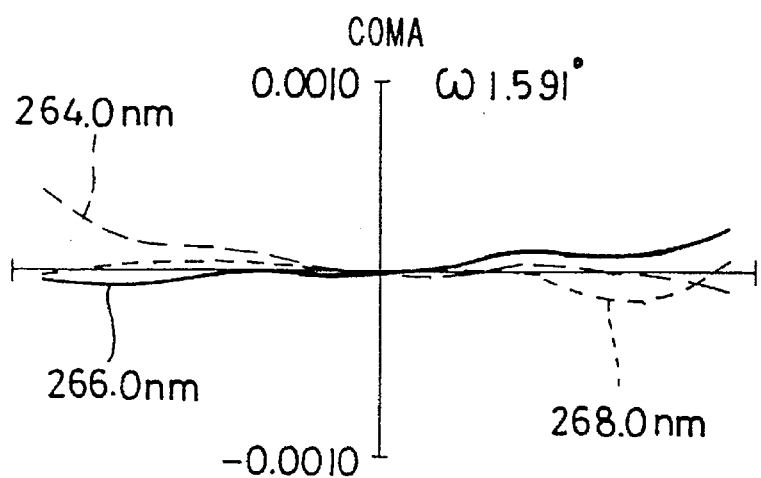
FIG. 24A, FIG. 24B and FIG. 24C show curves visualizing coma in the eighth embodiment of the present invention.
Figure 24B:
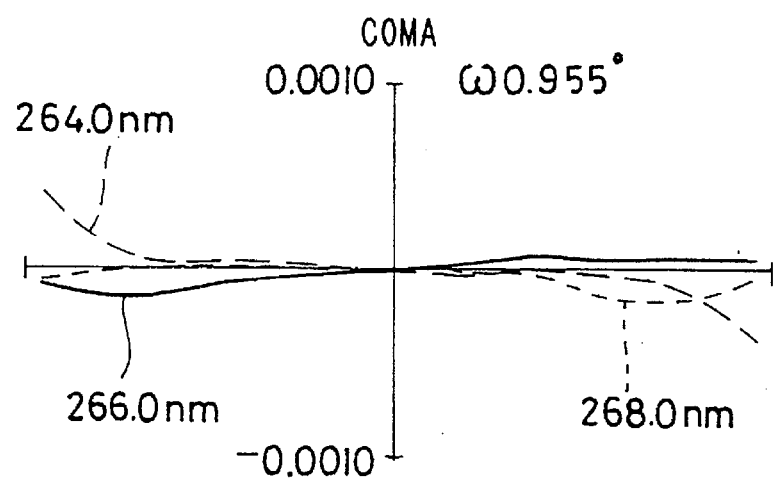
Figure 24C:
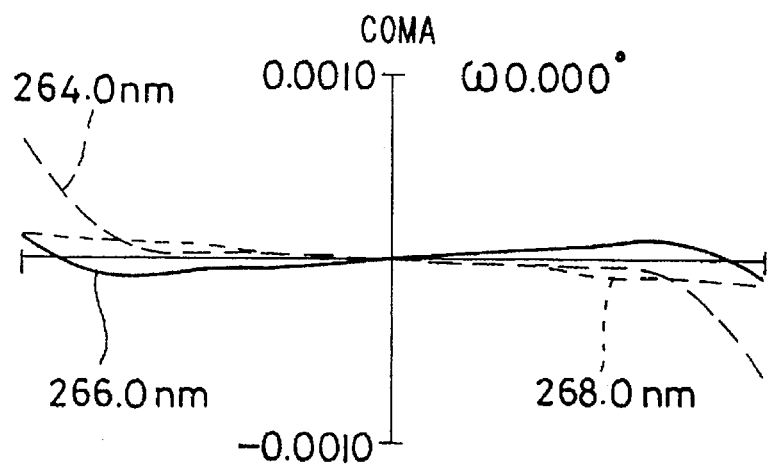
Figure 27A:
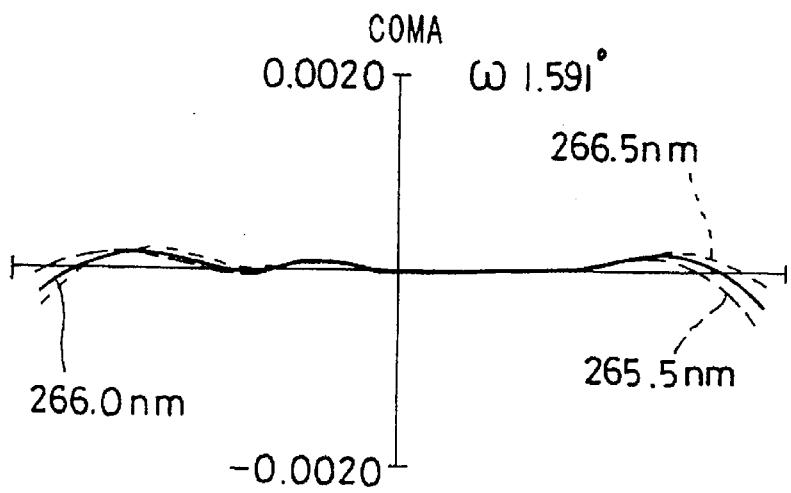
FIG. 27A, FIG. 27B and FIG. 27C show curves visualizing come in the ninth embodiment of the present invention.
Figure 27B:
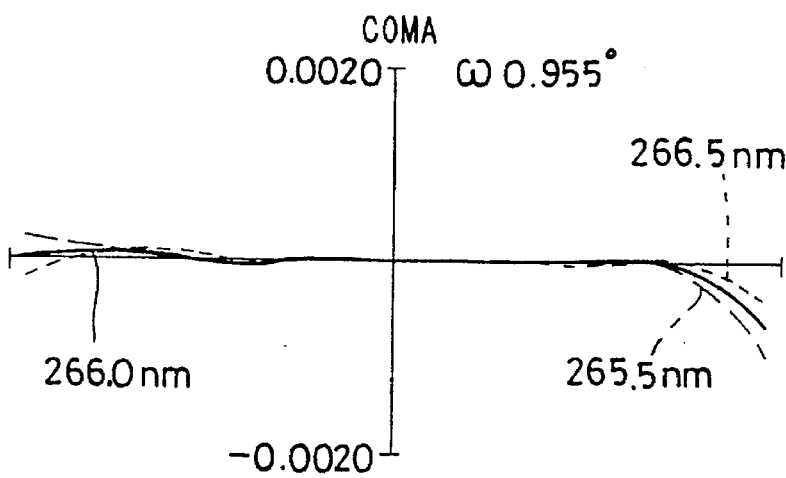
Figure 27C:
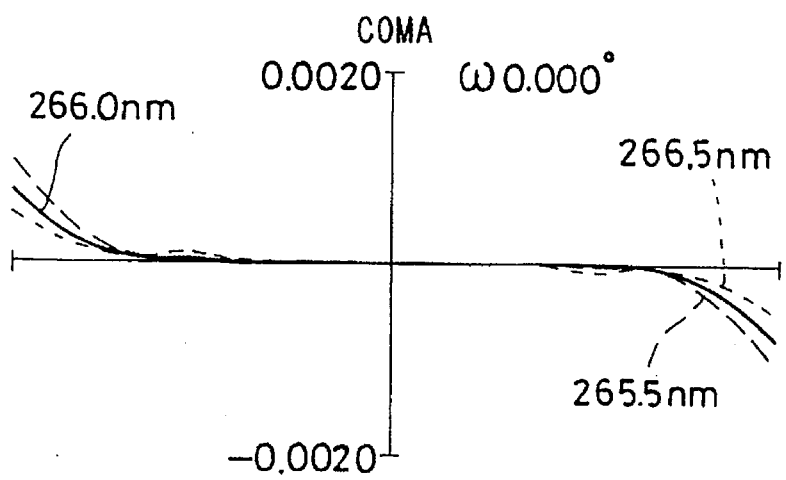
Figure 28:
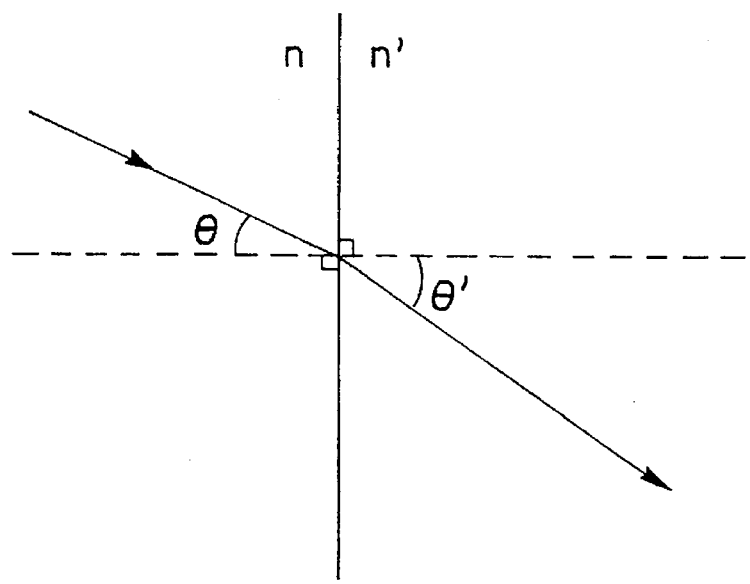
FIG. 28 shows a diagram illustrating refraction of light by an ordinary glass material.
Figure 29:
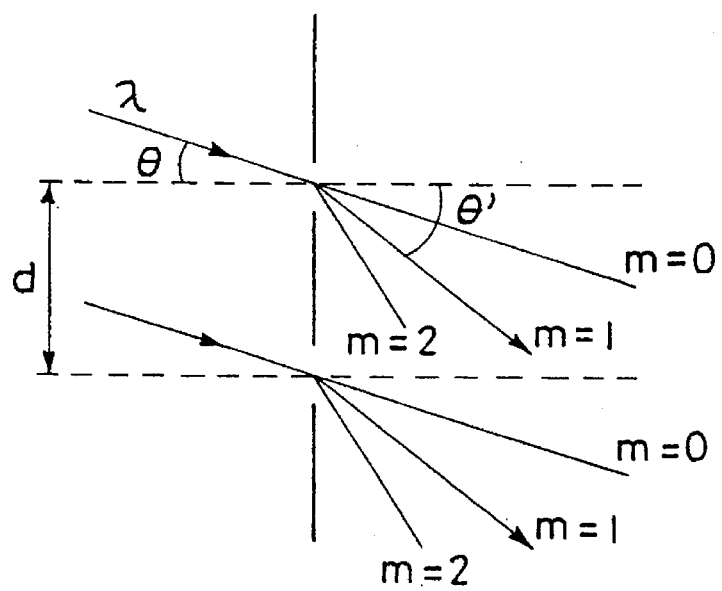
FIG. 29 shows a diagram illustrating refraction of light in the diffraction phenomenon.
Figure 30:
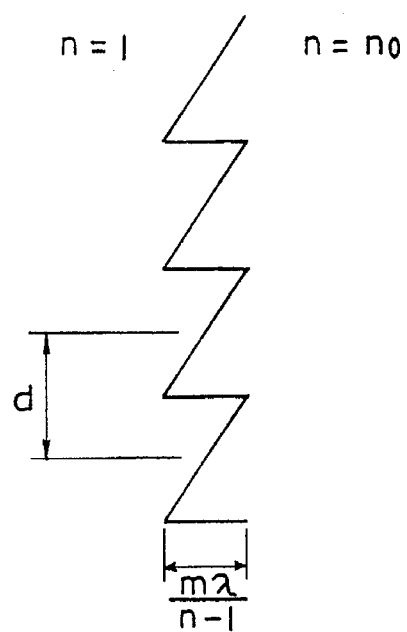
FIG. 30 shows a sectional view illustrating a diffractive optical element in a condition where it is blazed.
Figure 31:
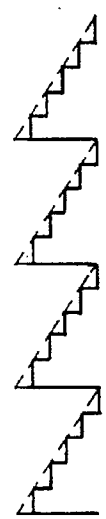
FIG. 31 shows a sectional view illustrating a diffractive optical element which is subjected to the binary approximation.

The eighth embodiment and the ninth embodiment have the compositions illustrated in FIG. 22 and FIG. 25 respectively, and are configured as objective lens systems for laser scanning microscopes (LSM's) which use DUV (deep ultraviolet) laser. All of the refractive lens components used in these two embodiments are made of fused silica. The eighth embodiment is configure so as to correct chromatic aberration at a wavelength of 266±2 nm. This embodiment uses three diffractive optical elements: DOE1 functioning to correct the longitudinal chromatic aberration, DOE3 serving for correcting the lateral chromatic aberration, and DOE2 adopted for correcting residual longitudinal chromatic aberration and lateral chromatic aberration. The ninth embodiment uses only one diffractive optical element (DOE) for correcting mainly the longitudinal chromatic aberration. The eighth embodiment and the ninth embodiment have contact surfaces at locations 1.386133 mm distant on the object side from the surface $r_{31}$ and 1.3819 mm distant on the object side from the surface $r_{27}$ respectively as indicated by the reference symbol B in the sectional views thereof.

In all of the embodiments of the present invention described above, spherical aberration, coma and other aberrations are corrected by utilizing the effects of the diffractive optical elements which are equivalent to those obtainable with aspherical surfaces. Further, $n_U=10001$ is selected for all the embodiments. In addition, the object side of the embodiments is traced on the right side in the sectional views illustrating the compositions thereof, and the graphs visualizing the aberration characteristics of the embodiments were traced by reverse pursuit of rays imaged onto object surfaces.

The objective lens system according to the present invention has a large numerical aperture and a high magnification, and is capable of favorably correcting aberrations, in particular chromatic aberration. All of the refractive optical elements are made of the same material, in particular, in the sixth through ninth embodiments of the present invention.

I claim:

1. An objective lens system comprising in order from the object side:

a first lens unit including one of a plano-convex lens component having a planar surface on the object side and a meniscus lens component having a concave surface on the object side, said first lens unit has a positive refractive power as a whole; and a second lens unit including at least one diffractive optical element;

wherein said objective lens system satisfies the following conditions (1), (2) and (4):

(1) $D_1/D>0.8$ (2) $(h \times f) / (L \times I) > 0.07$ (4) $0.5 < |R/t| < 5$ wherein the reference symbol $D_1$ represents a diameter of a marginal light bundle as measured at a location on said diffractive optical element, the reference symbol D designates a maximum diameter of a marginal light bundle in said objective lens system, the reference symbol h denotes a height of a principal ray at a location on said diffractive optical element, the reference symbol f represents a focal length of said objective lens system, the reference symbol L designates a parfocality length of said objective lens system, the reference symbol I denotes a maximum image height on a specimen surface, the reference symbol R represents a radius of curvature on an image side surface of one of said plano-convex lens component and said meniscus lens component and the reference symbol t designates thickness of said one of said plano-convex lens component and said meniscus lens component.

2. An objective lens system according to claim 1 wherein said diffractive optical element has a function which is equivalent to that of an aspherical refractive surface.

3. An objective lens system according to claim 1 wherein said first lens unit comprises a cemented meniscus lens component having a convex surface on the image side and a meniscus lens component having a convex surface on the image side, and wherein said second lens unit comprises three doublets.

4. An objective lens system according to claim 1 wherein said first lens unit consists of two lens components, wherein said second lens unit comprises a cemented doublet consisting of a lens element made of fused silica and a lens element made of fluorite, and two lens components, and wherein said diffractive optical element is disposed on the object side of said second lens unit.

5. An objective lens system according to claim 1 wherein said objective lens system comprises said first lens unit comprising, in order from the object side, a meniscus lens component having a concave surface on the object side and a meniscus lens component, and said second lens unit comprising, in order from the object side, a biconvex lens component, a diffractive optical element, a positive lens component, a diffractive optical element and a meniscus lens component.

6. An objective lens system according to claim 1 wherein said objective lens system comprises, a first lens unit comprising, in order from the object side, a meniscus lens component having a concave surface on the object side and a meniscus lens component, and a second lens unit comprising, in order from the object side, a diffractive optical element, a biconvex lens component, a diffractive optical element, a positive lens component, two menisdus lens components having convex surfaces opposed to each other, a diffractive lens element and a biconcave lens component.

7. An objective optical system according to claim 1 wherein said objective lens system comprises said first lens unit comprising, in order from the object side, a lens component having a concave surface on the object side and two meniscus lens components, and said second lens unit comprising, in order from the object side, a diffractive optical element, a positive lens component, two meniscus lens components having concave surfaces opposed to each other, a diffractive optical element, a positive lens component, a plano-convex lens component, a diffractive optical element disposed on the planer surface of the plano-convex lens component, a meniscus lens component, a biconcave lens component, a biconcave lens component and a positive meniscus lens component.

8. An objective lens system according to claim 1 wherein said objective lens system comprises said first lens unit comprising, in order from the object side, a meniscus lens component having a concave surface on the object side and two meniscus lens components, and said second lens unit, in order from the object side, a diffractive optical element, a biconvex lens component, a biconcave lens component, a meniscus lens component, a biconvex lens component, two meniscus lens components, a biconcave lens component, a meniscus lens component and a meniscus lens component.

9. An objective lens system comprising two diffractive optical elements and two meniscus lens components having convex surfaces opposed to each other disposed between said two diffractive optical elements and wherein said objective lens system comprises a lens component made of fused silica and a plurality of diffractive elements.

10. An objective lens system comprising two diffractive optical elements and two meniscus lens components having concave surfaces opposed to each other disposed between said two diffractive optical elements and wherein said objective lens system comprises a lens component made of fused silica and a plurality of diffractive elements.

11. An objective lens system comprising:

two diffractive optical elements; and two meniscus lens components having convex surfaces opposed to each other disposed between said two diffractive optical elements, and wherein at least one of said diffractive optical elements satisfies at least one of the following conditions (1) and (2):

(1) $D_1/D > 0.8$ (2) $(h \times f) / (L \times I) > 0.07$ wherein the reference symbol $D_1$ represents a diameter of a marginal light bundle as measured at a location on said diffractive optical element, the reference symbol D designates a maximum diameter of the marginal light bundle in said objective lens system, the reference symbol h denotes a height of a principle ray at the location on said diffractive optical element, the reference symbol f represents a focal length of said objective lens system, the reference symbol L designates a parfocality length of said objective lens system, and the reference symbol I denotes a maximum image height on a specimen surface.

12. An objective lens system comprising:

two diffractive optical elements; and two meniscus lens components having concave surfaces opposed to each other disposed between said two diffractive optical elements, and wherein at least one of said lens components is made of fused silica, and at least one of said diffractive optical elements satisfies at least one of the following conditions (1) and (2):

(1) $D_1/D > 0.8$ (2) $(h \times f) / (L \times I) > 0.07$ wherein the reference symbol $D_1$ represents a diameter of a marginal light bundle as measured at a location on said diffractive optical element, the reference symbol D designates a maximum diameter of the marginal light bundle in said objective lens system, the reference symbol h denotes height of a principle ray at a location on said diffractive optical element, the reference symbol f represents a focal length of said objective lens system, the reference symbol L designates a parfocality length of said objective lens system, and the reference symbol I denotes a maximum image height on a specimen surface.

* * * * *